(12) United States Patent
Cho et al.

(10) Patent No.: US 9,424,790 B2
(45) Date of Patent: Aug. 23, 2016

(54) PORTABLE DEVICE AND CONTROL METHOD FOR THE SAME

(71) Applicant: LG Electronics Inc., Seoul (KR)

(72) Inventors: Eunhyung Cho, Seoul (KR); Sinae Chun, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 14/480,303

(22) Filed: Sep. 8, 2014

(65) Prior Publication Data

US 2014/0375702 A1    Dec. 25, 2014

Related U.S. Application Data

(63) Continuation-in-part of application No. 13/905,880, filed on May 30, 2013, now Pat. No. 8,860,656.

(30) Foreign Application Priority Data

Apr. 18, 2013  (KR) .................. 10-2013-0043176
May 22, 2013  (WO) ................ PCT/KR2013/004488

(51) Int. Cl.
*G09G 5/10* (2006.01)
*G09G 3/36* (2006.01)
*G06F 3/0488* (2013.01)
(Continued)

(52) U.S. Cl.
CPC ............ *G09G 3/3611* (2013.01); *G06F 1/1643* (2013.01); *G06F 1/1652* (2013.01); *G06F 1/3218* (2013.01); *G06F 1/3265* (2013.01); *G06F 3/03* (2013.01); *G06F 3/0488* (2013.01); *G06F 3/1438* (2013.01); *G09G 5/10* (2013.01);
(Continued)

(58) Field of Classification Search
None
See application file for complete search history.

(56) References Cited

U.S. PATENT DOCUMENTS

2008/0165116 A1   7/2008   Herz et al.
2010/0085382 A1   4/2010   Lundqvist et al.
(Continued)

FOREIGN PATENT DOCUMENTS

KR   10-2010-0019164 A   2/2010
KR   10-2012-0091975 A   8/2012

OTHER PUBLICATIONS

U.S. Appl. No. 13/905,880, filed May 30, 2013.
(Continued)

*Primary Examiner* — Andrew Sasinowski
*Assistant Examiner* — Henok Heyi
(74) *Attorney, Agent, or Firm* — Birch, Stewart, Kolasch & Birch, LLP

(57) ABSTRACT

Disclosed are a portable device and a control method thereof for convenient and accurate dimming control. The portable device includes a foldable display unit, a state sensor unit to detect folded and unfolded states of the foldable display unit, an input sensor unit to sense user input and a processor to control the respective units. The processor converts the portable device from a first dimming mode to a second dimming mode upon detection of change of the foldable display unit from the unfolded state to the folded state, perform dimming of the foldable display unit based on a dimming time different with the second dimming time when the user input is sensed in the second dimming mode within a second dimming time, and performs dimming of the foldable display unit after the second dimming time has passed when the user input is not sensed in the second dimming mode within the second dimming time.

20 Claims, 14 Drawing Sheets

(51) Int. Cl.
- *G06F 1/16* (2006.01)
- *G06F 1/32* (2006.01)
- *G06F 3/03* (2006.01)
- *G06F 3/14* (2006.01)

(52) U.S. Cl.
CPC .... *G09G 2320/0626* (2013.01); *G09G 2380/02* (2013.01); *Y02B 60/1242* (2013.01)

(56) References Cited

U.S. PATENT DOCUMENTS

| | | |
|---|---|---|
| 2010/0117975 A1 | 5/2010 | Cho |
| 2010/0302219 A1 | 12/2010 | Kitashou |
| 2012/0050338 A1 | 3/2012 | Rabii |
| 2012/0081306 A1 | 4/2012 | Sirpal et al. |
| 2012/0169594 A1 | 7/2012 | Zhao et al. |
| 2012/0223872 A1 | 9/2012 | Ram |
| 2012/0281027 A1 | 11/2012 | Kim |
| 2012/0315960 A1* | 12/2012 | Kim .............. H04W 52/0254 455/574 |
| 2013/0009858 A1* | 1/2013 | Lacey .............. G06F 1/1643 345/156 |

OTHER PUBLICATIONS

U.S. Appl. No. 14/049,991, filed Oct. 8, 2013.

* cited by examiner

FIG. 3

| MODE OF DEVICE | DIMMING TIME | Brightness (Optional) | TOUCH SENSING REGION (Optional) |
|---|---|---|---|
| FIRST DIMMING MODE | FIRST DIMMING TIME | FIRST BRIGHTNESS | OVERALL REGION |
| SECOND DIMMING MODE | SECOND DIMMING TIME | SECOND BRIGHTNESS | PARTIAL REGION |

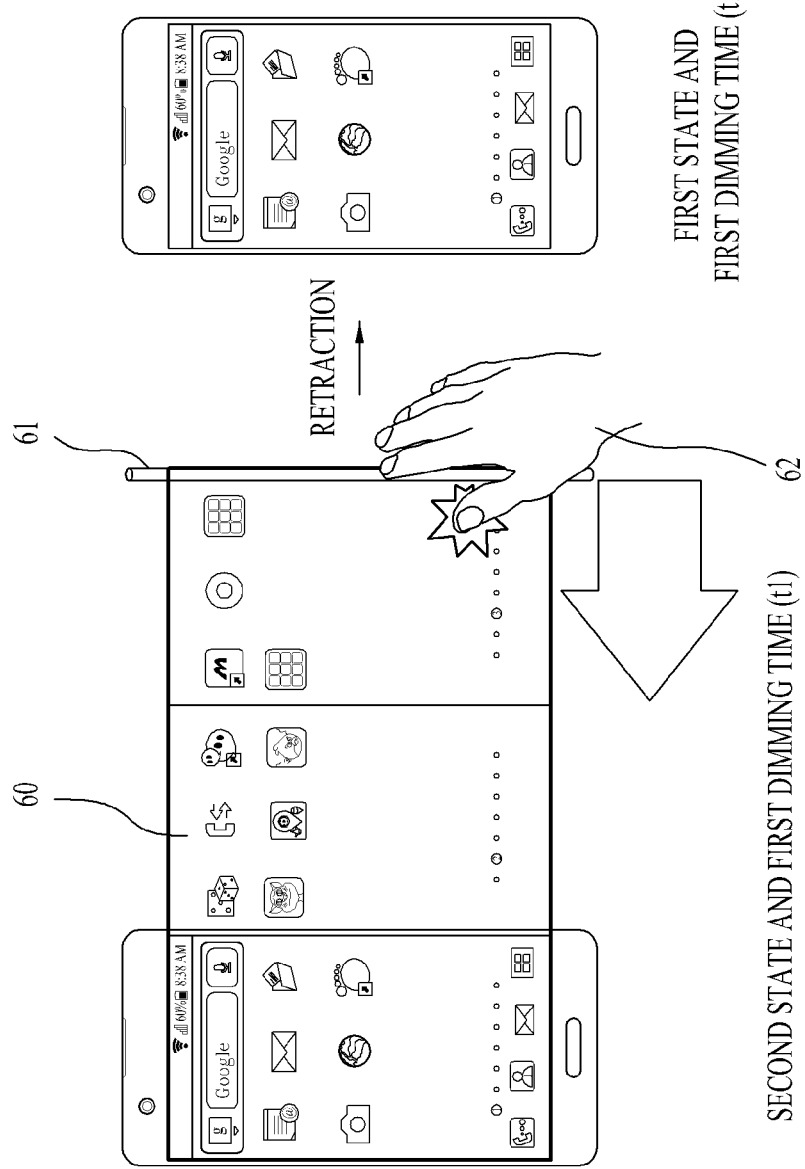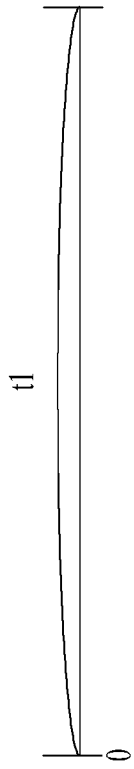

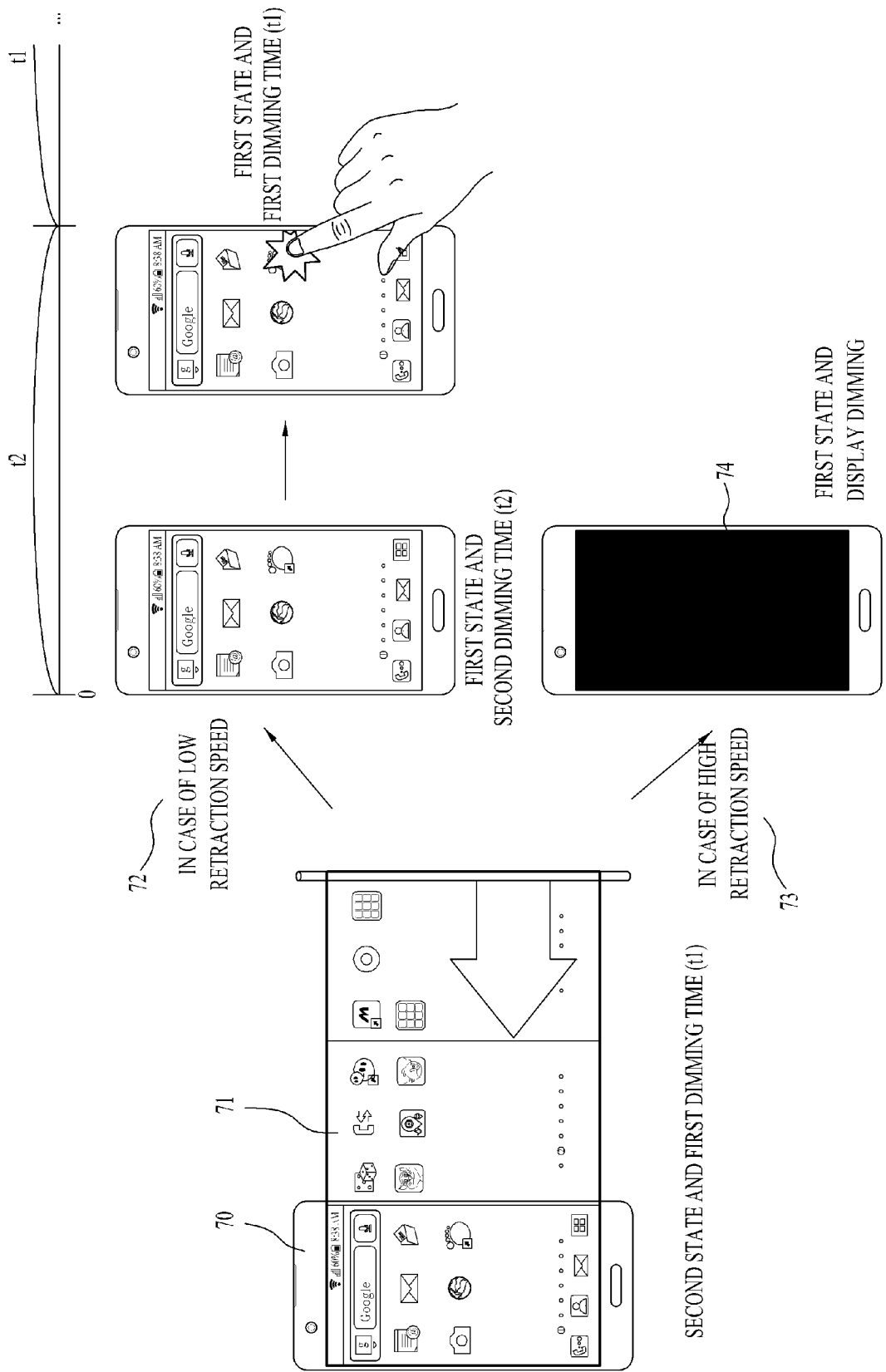

FIG. 8
(1) IN CASE OF APPLICATION PROVIDING RETRACTION MODE
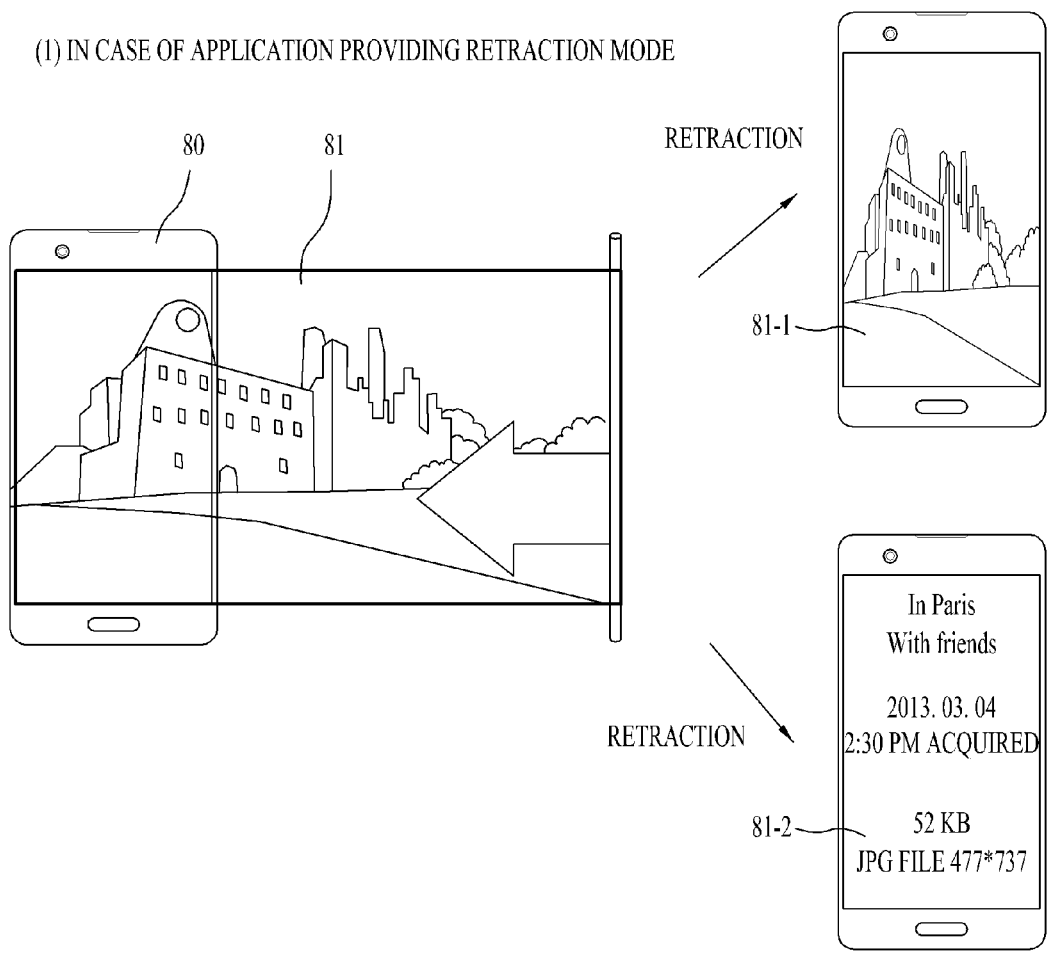
(2) IN CASE OF APPLICATION NOT PROVIDING RETRACTION MODE
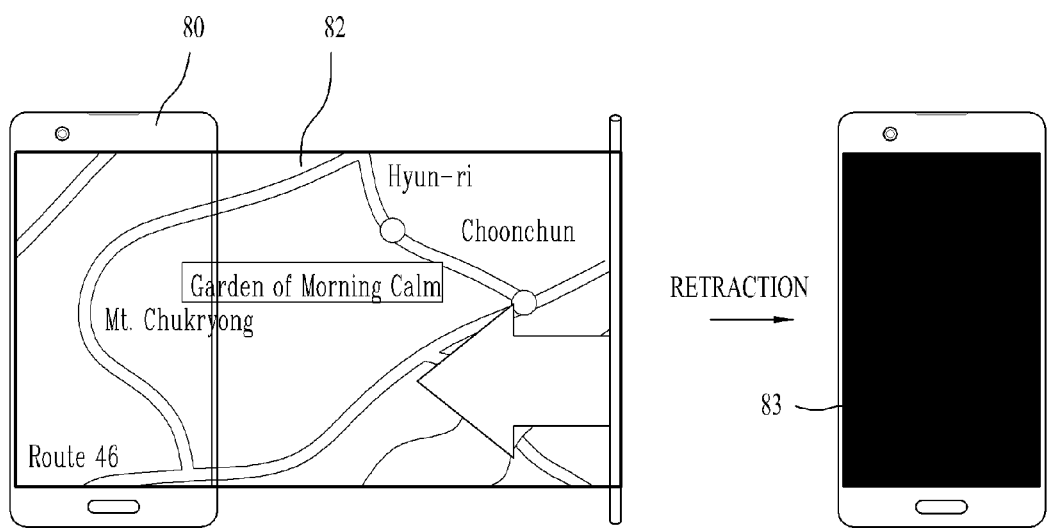

PORTABLE DEVICE AND CONTROL METHOD FOR THE SAME

This application is Continuation-in-Part of U.S. Non-Provisional application Ser. No. 13/905,880, filed on May 30, 2013, which claims the priority benefit of Korean Patent Application No. 10-2013-0022317, filed on Feb. 28, 2013, and the priority benefit of International Patent Application No. PCT/KR2013/002486, filed on Mar. 26, 2013, which are all hereby incorporated by reference as if fully set forth herein.

BACKGROUND OF THE INVENTION

1. Field of the Invention

The disclosure relates to a portable device equipped with a flexible display unit, and more particularly to a device with a controllable dimming mode according to predetermined user input and a retraction signal of a flexible display unit, and a control method for the same.

2. Discussion of the Related Art

Users place great importance on mobility of electronic appliances. In particular, various portable electronic devices that provide the performance of a desktop computer and a mobile phone have been sold in recent years. The portable electronic devices are reduced in size and weight, which allows users to utilize various electronic information even during movement.

In the case of portable devices, they have been developed to perform a variety of functions as well as basic functions, such as data transmission/reception. Therefore, it is necessary to allow the user to more conveniently and accurately control such devices. In particular, through the supply of a flexible display panel, recent portable devices enable expansion of a display. Accordingly, there is demand for a control method to provide user convenience with regard to expansion and retraction of a display unit.

SUMMARY OF THE INVENTION

Accordingly, the disclosure is directed to a portable device and a control method for the same that substantially obviate one or more problems due to limitations and disadvantages of the related art.

In one embodiment, an object of the disclosure is to provide a device with a controllable dimming mode according to user input and folding state of a foldable display unit and a control method for the same.

In another embodiment, an object of the disclosure is to provide a device with a controllable dimming mode according to the folding speed of a foldable display unit and a control method for the same.

In another embodiment, an object of the disclosure is to provide a device with a controllable dimming mode according to an application that is being displayed on a foldable display unit and a control method for the same.

In a further embodiment, an object of the disclosure is to provide a device including a sensor to sense user input, i.e. at least one of the face, gaze direction, and voice of a user and a control method for the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with one embodiment, to achieve the above-described object, there are provided a portable device includes a foldable display unit including a first display region and a second display region, a state sensor unit configured to detect a folded state and an unfolded state of the foldable display unit, an input sensor unit configured to sense user input and a processor configured to control the foldable display unit, the state sensor unit and the input sensor unit, wherein the portable device provides a dimming mode for dimming the foldable display unit when the user input is not sensed for a dimming time, and wherein the processor is further configured to convert the portable device from a first dimming mode to a second dimming mode upon detection of change of the foldable display unit from the unfolded state to the folded state, wherein the first dimming mode provides a first dimming time, wherein the second dimming mode provides a second dimming time different with the first dimming time, to perform dimming of the foldable display unit upon reaching the second dimming time when the user input is not sensed in the second dimming mode within the second dimming time, and a control method for the same and to perform dimming of the foldable display unit based on a dimming time different with the second dimming time when the user input is sensed in the second dimming mode within the second dimming time.

Meanwhile, the portable device that will be described below may include a flexible display unit or a foldable display unit. In addition, the flexible display unit and the foldable display unit may be described as being synonymous with each other. For example, an expanded state of the flexible display unit may correspond to an unfolded state of the foldable display unit and a retracted state of the flexible display unit may correspond to a folded state of the foldable display unit.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 is a table explaining dimming modes of the device;

FIG. 6 is a view showing a portable device with a controllable dimming mode according to user touch input and retraction of a display unit according to one embodiment;

FIG. 7 is a view showing a portable device with a controllable dimming mode according to the retraction speed of a display unit according to one embodiment;

FIG. 8 is a view showing a portable device with a controllable dimming mode according to whether or not a retraction mode of an application is provided according to one embodiment;

DETAILED DESCRIPTION OF THE INVENTION

Figure 1:
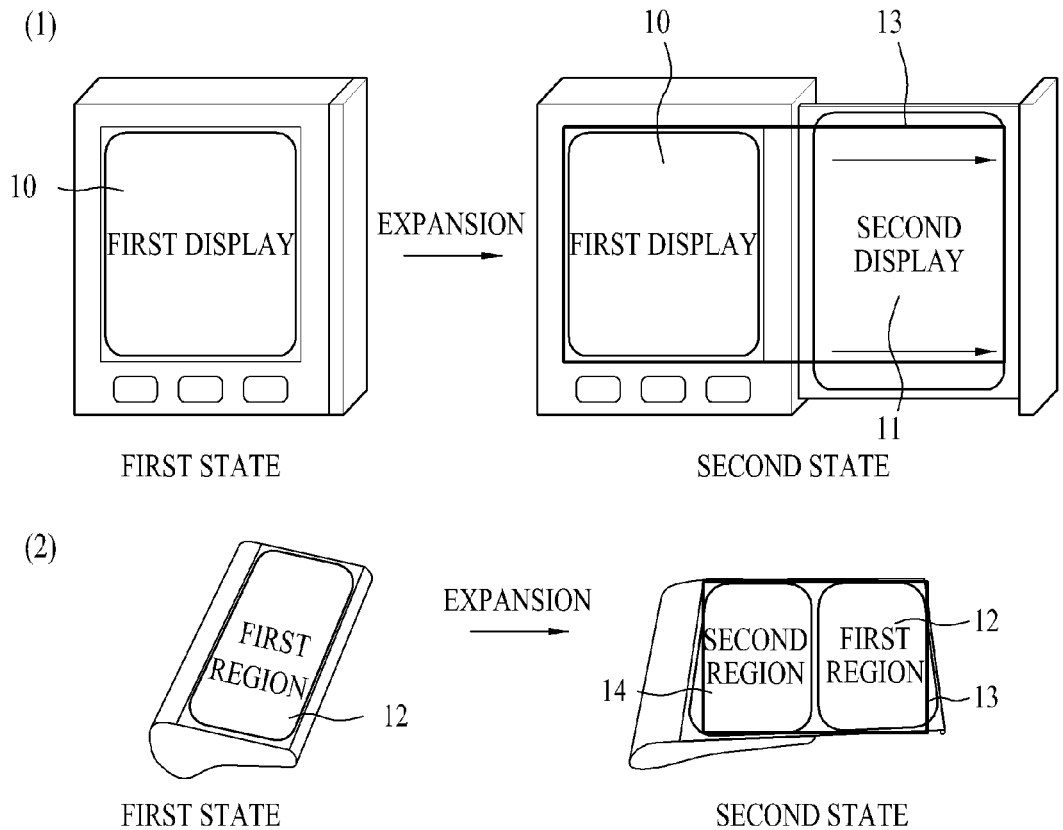
FIG. 1 is a view showing a portable device equipped with a flexible display unit according to one embodiment.

Although the terms used in the following description are selected, as much as possible, from general terms that are widely used at present while taking into consideration of the functions of the disclosure, these terms may be replaced by other terms based on intensions of those skilled in the art, customs, emergence of new technologies, or the like. In addition, in a particular case, terms that are arbitrarily selected by the applicant of the disclosure may be used. In this case, the meanings of these terms may be described in corresponding description parts of the embodiments. Accordingly, it should be noted that the terms used herein should be construed based on practical meanings thereof and the whole content of this specification, rather than being simply construed based on names of the terms.

Moreover, although the embodiments will be described herein in detail with reference to the accompanying drawings and content described in the accompanying drawings, it should be understood that the disclosure is not limited to or restricted by the embodiments.

Portable devices are becoming much thinner and lighter with advances in electronic device fabrication technology. The disclosure relates to a portable electronic device, which is hereinafter referred to as a portable device. The portable device refers to various electronic devices having mobility including, for example, a mobile phone, a Personal Digital Assistant (PDA), a laptop computer, a tablet PC, an MP3 player, a CD player, and a DVD player. Hereinafter, the portable device will simple be referred to as a device.

Advance in the technologies of display elements equipped in devices has enabled production of flexible display units. A flexible display unit is formed of a flexible substrate that is pliable, bendable or roll-able without loss of display characteristics, differently from a conventional hard display panel. The flexible display unit is also referred to as e-paper. The flexible display unit is lighter and thinner and has greater shock-resistance than conventional hard display panels, and is freely bendable. The substrate used in the flexible display unit may be fabricated as a metal foil, very thin glass, or plastic substrate. In particular, in the case of a plastic substrate, a polycarbonate (PC) substrate, a polyethylene terephthalate (PET) substrate, a polyether sulfone (PES) substrate, a polyimide (PI) substrate, a polyethylene naphthalate (PEN) substrate, and an acrylate substrate may be used. Meanwhile, in the present disclosure, the flexible display unit is a superordinate concept to a flexible display, and is a generic term for a display unit that is constructed of at least one flexible display or a plurality of separate displays and has an adjustable display area. The flexible display unit may be installed to the device via any of various ways. An installation method of the flexible display unit will be described hereinafter in more detail with reference to FIG. 1. In the following description, the flexible display unit may be referred to simply as "display" or "display unit", and is distinguished from a flexible display.

The disclosure relates to a control method for the aforementioned flexible display unit, and provides a dimming function of the flexible display unit. Dimming may indicate that the device interrupts supply of power to the display for device power conservation when user input is not sensed for a predetermined time. Alternatively, dimming may indicate that the device is blackened out when lack of user input for a predetermined time is sensed. Alternatively, dimming may indicate that the display adjusts luminance of the display such that brightness of an execution screen gradually becomes darker or dimmer according to the lapse of time when lack of user input for a predetermined time is sensed. Since lack of user input for a predetermined time refers to that a user does not use the device, in this case, interrupting supply of power to the display unit is advantageous in terms of energy consumption and economical efficiency. Accordingly, the dimming function of the display unit allows the device to be more efficiently used for an extended time using a limited battery capacity. Dimming may be classified into a plurality of dimming modes based on a dimming time, screen brightness, or touch sensing region. This will be described hereinafter in more detail with reference to FIG. 2.

Moreover, in the case in which the display unit is dimmed because the user does not use the device, the device may be locked. In the disclosure, the locked state of the device may refer to: 1) that the device is operated differently from the intention of the user; and 2) that specific units of the device are deactivated to prevent unnecessary power consumption of the device. More specifically, the locked state of the device may indicate that the device deactivates at least one of a flexible display unit, a measurement unit, and a sensor unit. As a result of the display unit being dimmed and simultaneously, the device being locked such that the specific units are deactivated, the device may more efficiently accomplish the goal of power conservation. However, it is noted that dimming of the display unit and locking of the device do not essentially occur at the same time, and may be individually performed in some embodiments and the disclosure is not limited to the above description. Meanwhile, use of the device by the user may be partially or wholly restricted in the locked state of the device, and it is possible to allow the user to freely use the device when the device is unlocked according to a predetermined unlocking sequence of the device.

Meanwhile, in the disclosure, conversion of a dimming mode may be triggered by retraction of the flexible display unit. This is because retraction of the display unit likely indicates that the user no longer wishes to use the display unit. Accordingly, as the device is converted into a dimming mode that provides a short dimming time in response to a retraction signal of the display unit, a more effective and intuitive dimming control method may be provided. Hereinafter, a method of controlling a dimming mode according to retraction of the display unit will be described in detail with reference to FIGS. 4 to 9.

FIG. 1 is a view showing a portable device equipped with a flexible display unit 13 according to one embodiment. The flexible display unit 13 may be installed to the device via any of various ways according to the use purpose and design thereof. In the disclosure, the flexible display unit 13 may include a single flexible display, the area or length of which is expandable. Alternatively, the flexible display unit 13 may include a plurality of inflexible displays or flexible displays. With regard to the size thereof, the flexible display unit 13 may have a first state before the flexible display unit 13 is expanded, and a second state after the flexible display unit 13 is expanded. The size of the flexible display unit 13 in the first state and the second state may be changed according to an installation method of the flexible display unit 13. Therefore, hereinafter, the size of the flexible display unit 13 depending on the installation method of the display unit will be described.

FIG. 1-(1) is a view showing a portable device equipped with a main display 10 and a sub display 11 according to one embodiment. More specifically, FIG. 1-(1) shows one embodiment in which the flexible display unit 13 defines a first display 10 and a second display 11. In the present embodiment, the flexible display unit 13 may include the first display 10 and the second display 11. In addition, in the present embodiment, the second display 11 may be a flexible display, or may be an inflexible display.

The second display 11 may be accommodated in the device in a slide-in manner or in a roll-in manner. In one embodiment, when the second display 11 is accommodated in the device in a slide-in manner, the user may expand the flexible display unit 13 by sliding out the second display 11 beyond a predetermined length. In this case, a state in which the entirety or a portion of the second display 11 slides out of the device may be referred to as a second state of the flexible display unit 13. On the contrary, in the second state of the flexible display unit 13, the user may retract the flexible display unit 13 by inwardly sliding the second display 11 until the length of the flexible display unit 13 reaches the predetermined length or less. In this case, a state in which the entirety of the second display 11 slides into the device may be referred to as a first state of the flexible display unit 13.

In another embodiment, when the second display 11 is accommodated in the device in a roll-in manner, a state in which the second display 11 is rolled out of the device beyond a predetermined length of the flexible display unit 13 may be referred to as a second state of the flexible display unit 13. On the contrary, a state in which the second display is rolled inward of the device until the length of the flexible display unit 13 reaches the predetermined length or less may be referred to as a first state of the flexible display unit 13. In other words, with regard to the size of the flexible display unit 13, the flexible display unit 13 may have the first state and the second state classified based on the predetermined length. Meanwhile, when the second display 11 is accommodated in the device in a roll-in manner, the second display 11 may be a flexible display.

FIG. 1-(2) is a view showing a portable device equipped with the flexible display unit 13, the area or length of which is expandable. More specifically, FIG. 1-(2) shows one embodiment in which the display unit 13 includes a single flexible display installed to the device.

In one embodiment, the display unit 13 may be accommodated in the device in a roll-in manner. The accommodated display unit 13 may be manually or automatically expanded. With regard to the size thereof, the display unit 13 may be classified into a first state and a second state according to whether the display unit 13 is rolled inward or rolled outward. More specifically, a state in which the display unit 13 is rolled into the device to reach a predetermined length or less may be referred to as a first state. In this case, a region of the display unit 13 exposed outward of the device may be referred to as a first region 12. In addition, a state in which the display unit 13 is rolled out of the device beyond the predetermined length may be referred to as a second state. In this case, an expanded display region resulting from the display unit 13 being rolled out may be referred to as a second region. In other words, a region of the display region in the second state of the display unit 13 except for the first region 12 may be referred to as a second region 14. Accordingly, the length or area of the second region 14 may be changed according to a rolling movement degree of the display unit 13.

As described above, with regard to the size thereof, the display unit 13 may be classified into the first state and the second state according to whether or not the display unit 13 is expanded beyond a predetermined length. In addition, the display unit 13 may have any one state among the first state and the second state as described above. Meanwhile, in the disclosure, the predetermined length may represent a substantial threshold, and may be within a predetermined tolerance range. Hereinafter, a dimming mode control method will be described based on the size of the display unit 13 as described above. Meanwhile, it will be appreciated that the installation method of the display unit 13 is not restricted as to the above-described embodiments, and the display unit 13 may be installed to the device via any one of various other ways according to the design or use purpose thereof.

With reference again to FIG. 1-(1), when the portable device is in the second state, the portable device may display images respectively on the first display 10 and the second display 11. In addition, when the portable device is in the second state, the portable device may display an image only on the first display 10 or the second display 11. The portable device may be changed from the second state to the first state as the second display 11 is rolled inward. Once the portable device is changed to the first state, the portable device may display an image on the first display 10 without displaying an image on the second display 11. In addition, the image displayed on the second display 11 may gradually slide into the first display 10 based on an inward rolling degree of the second display 11.

With reference again to FIG. 1-(2), when the portable device is in the second state, the portable device may display images respectively in the first region 12 and the second region 14. In addition, when the portable device is in the second state, the portable device may display an image only in the first region 12 or the second region 14. The portable device may be changed from the second state to the first state as the display unit 13 is rolled inward. Once the portable device is changed to the first state, the portable device may display no image in the second region 14 because the second region 14 has been rolled inward and is no longer exposed outward.

Figure 2:
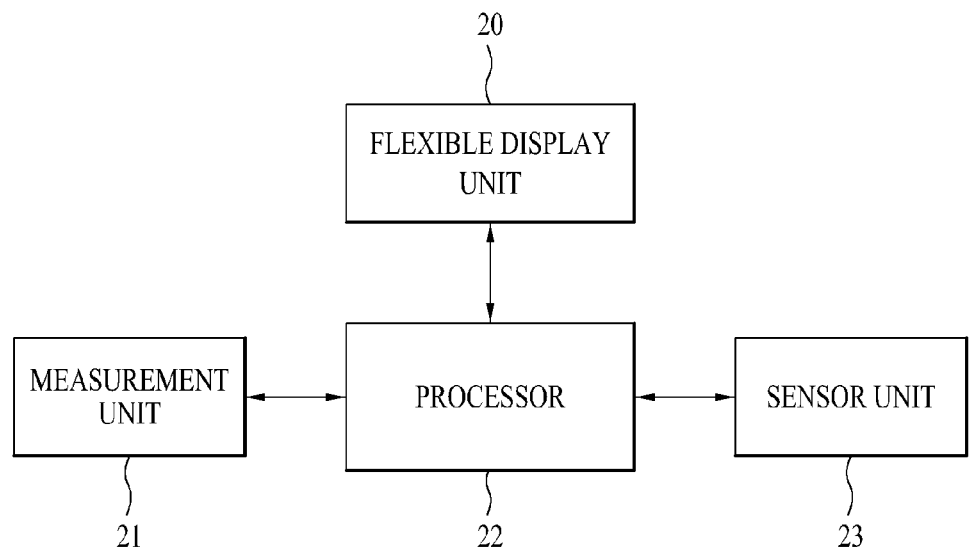
FIG. 2 is a block diagram showing a portable device according to one embodiment.

FIG. 2 is a block diagram showing a portable device according to one embodiment. In FIG. 2, the device may include a flexible display unit 20, a measurement unit 21, a sensor unit 23, and a processor 22.

The flexible display unit 20 may output an image on a display screen. In particular, the flexible display unit 20 of the disclosure may gradually display an image according to expansion of the length or area thereof. In the present embodiment, the flexible display unit 20 may output an image in response to a control instruction of the processor 22 or content executed by the processor 22. Alternatively, the flexible display unit 20 may output a display page of content executed by the processor 22. In the disclosure, the image may refer to a stationary image, a moving image, text or any of various other visible images that may be displayed on the flexible display unit 20.

The flexible display unit 20 may be dimmed by the processor 22. Dimming of the flexible display unit 20, as described above, may indicate that the processor 22 interrupts supply of power to the flexible display unit 20 when user input is not sensed within a predetermined time. Details related to dimming have been described above.

The flexible display unit 20 may be dimmed in any of various ways. In one embodiment, the processor 22 may perform dimming of the display unit 20 by interrupting supply of power to the flexible display unit 20 when a predetermined time has passed. Once the supply of power is interrupted, the screen of the display unit 20 may be blackened. Here, the black screen may indicate that the screen of the display unit is blackened upon interruption of the supply of power to the display unit 20. In another embodiment, the processor 22 may perform dimming of the display unit 20 by controlling the screen brightness of the display unit 20 so as to be gradually darker as the predetermined time has passed.

The measurement unit 21 may sense various user inputs and device environments, and transmit the sensed results to the processor 22 to allow the device to perform a command depending on the sensed results. More specifically, the measurement unit 21 may measure at least one of the expanded length and expansion speed of the flexible display unit 20, and transmit the measured result to the processor 22.

In one embodiment, the measurement unit 21 may include a measurement sensor that measures the expanded length or area of the flexible display unit 20. When the display unit 20 is expanded or retracted, the measurement unit 21 may measure the area or length of the expanded display unit 20 protruding outward from the device. Alternatively, the area or length of the unexpanded display unit 20 accommodated in the device may be measured. The measurement unit 21 may include a proximity sensor, a touch sensor or an infrared sensor, which serves to measure the expansion degree of the display unit 20.

In another embodiment, the measurement unit 21 may include a measurement sensor to measure the expansion or retraction speed of the flexible display unit 20. When the display unit 20 is expanded or retracted, the speed measurement unit may measure an instantaneous speed at a specific point or an average speed in a specific expanded or retracted section of the display unit 20. Alternatively, when the display unit is rolled into a housing unit, the expansion/retraction speed may be measured by measuring an outward or inward rolling movement speed of the display unit. The measurement unit 21 may include any of various speed measurement sensors capable of measuring the expansion or retraction speed of the display unit 20, such as angular speed, expansion speed, retraction speed, instantaneous speed, average speed, acceleration, etc., and is not limited to the above-described embodiment.

The sensor unit 23 may sense user input or a device environment using at least one sensor mounted to the device, and transmit the sensed result to the processor 22. The sensor unit 23 may include at least one sensing means. In one embodiment, the at least one sensing means may include any of various sensing means, such as a touch sensor, a fingerprint sensor, a motion sensor, a pressure sensor, a microphone unit, a camera unit and the like. The sensor unit 23 is a generic term of the aforementioned various sensing means, and the aforementioned sensors may be embodied as separate elements included in the device, or may be combined to constitute at least one element included in the device.

In one embodiment, when the sensor unit 23 serves to sense user touch input, the device may be configured such that the sensor unit 23 is integrated with the display unit 20. As such, the device may sense various user inputs performed on the display unit 20 via the sensor unit 23. For example, when the sensor unit 23 is a touch sensor, the device may sense various user touch inputs performed on the display unit 20. In this case, the sensor unit 23 may sense any of various user touch inputs, such as a long-press touch input, a short-press touch input, a drag touch input, a release touch input, or a flicking touch input.

In another embodiment, the sensor unit 23 may serve to sense the face or gaze direction of the user as user input. The sensor unit 23 may sense the face of the user, and transmit the sensed result to the processor 22. Alternatively, the sensor unit 23 may sense the gaze direction or pupil of the user, and transmit the sensed result to the processor 22. To this end, in one embodiment, the sensor unit 23 may sense the face or gaze direction of the user using a camera unit.

In another embodiment, when the sensor unit 23 serves to sense the voice of the user as user input, the sensor unit 23 may include a microphone unit. The sensor unit 23 may sense the voice of the user, and transmit the sensed result to the processor 22.

In another embodiment, the sensor unit 23 may serve to sense input of pressing a physical button provided at the device. In addition, the sensor unit 23 may transmit the sensed result to the processor 22.

The processor 22 may execute any of various applications by processing internal data of the device. In addition, the processor 22 may control content that is executed by the device in response to a content control instruction. In addition, the processor 22 may control the above-described respective units of the device, and control data transmission/reception between the units. In addition, when the sensor unit 23 senses user input, the processor 22 may execute a command depending on the user input. In particular, in the disclosure, a dimming mode of the device may be controlled according to the sensed user input result.

The processor 22 may provide various dimming modes. The respective dimming modes may be classified based on at least one of a dimming time, screen brightness, and touch sensing region. The dimming modes will be described hereinafter in more detail with reference to FIG. 3. In addition, the processor 22 may control dimming of the display unit 20 according to user input, the retraction speed of the flexible display unit 20, or an application that is being displayed. A dimming mode control method will be described hereinafter in more detail with reference to FIGS. 4 to 8.

In the following description, when each operation of the portable device is initiated or performed by user input, a procedure of generating an input signal based on user input is contemplated as included in the above-described user input sensing operation even if the user input sensing operation is not repeatedly described. In addition, the processor may be described as controlling the device or at least one unit included in the device according to user input. In the following description, the processor may be synonymous with the device.

The portable device of one embodiment is exemplarily shown in FIG. 2 in the block diagram of FIG. 2, in which separate blocks logically classify elements of the device. Thus, the aforementioned elements of the device may be mounted as a single chip or a plurality of chips based on device design.

FIG. 3 is a table explaining dimming modes of the device. More specifically, the table explains two dimming modes classified based on a dimming time, screen brightness, or touch sensing region.

As described above, the device may provide a plurality of dimming modes based on a dimming time. In one embodiment, the device may provide a first dimming mode in which a predetermined dimming time is a first dimming time and a second dimming mode in which a predetermined dimming time is a second dimming time. In this case, the first dimming time may be longer than the second dimming time. In other words, the second dimming time may be shorter than the first dimming time. Since retraction of flexible display unit likely indicates that the user no longer wishes to use the display unit, conversion to the dimming mode that provides the shorter dimming time according to the retraction serves to more effectively reduce power consumption of the device.

Once conversion to one dimming mode has been performed, the device may count a dimming time corresponding to the corresponding dimming mode, and may initiate dimming of the display unit after the dimming time has passed. In one embodiment, the device may display a dimming time indicator that indicates a dimming time on the display unit. In one embodiment, the dimming time indicator may include a graphical user interface that indicates counting of a dimming time in real time.

In one embodiment, the device may provide the display unit with different screen brightness according to the respective dimming modes classified based on a dimming time. For example, the screen brightness of the display unit may include a first brightness in the first dimming mode and a second brightness in the second dimming mode. In this case, the first brightness and the second brightness may be equal to or different from each other. In another embodiment, the device may sense touch inputs in the same region or in different regions of the display unit according to the respective dimming modes. More specifically, the device may activate a touch sensor unit provided at a predetermined region of the display unit according to the dimming mode. When touch inputs are sensed in different regions, the touch sensing regions of the display unit may be an overall region of the display unit in the first dimming mode. In addition, the touch sensing regions of the display unit may be specific regions of the display unit in the second dimming mode. Here, the touch sensing regions may refer to a specific region of the display unit where a touch sensor is activated to sense user touch input.

The dimming time is an essential factor to classify the respective dimming modes. The following description is based on two dimming modes having different dimming times (i.e. the first dimming mode and the second dimming mode). More specifically, the dimming mode that provides the first dimming time is referred to as the first dimming mode, and the dimming mode that provides the second dimming time is referred to as the second dimming mode. Meanwhile, the screen brightness or touch sensing region of the display unit are optional factors to classify the respective dimming modes, and may be added or omitted according to the design or use purpose of the device or user setting. However, the optional factors to classify the respective dimming modes are not limited to the above-described embodiments, and various other factors may be added or omitted according to the use purpose and design of the device and user setting.

Conversion between the dimming modes may be accomplished by retraction of the display unit and predetermined user input. A mode conversion method will be described hereinafter in more detail.

Figure 4:
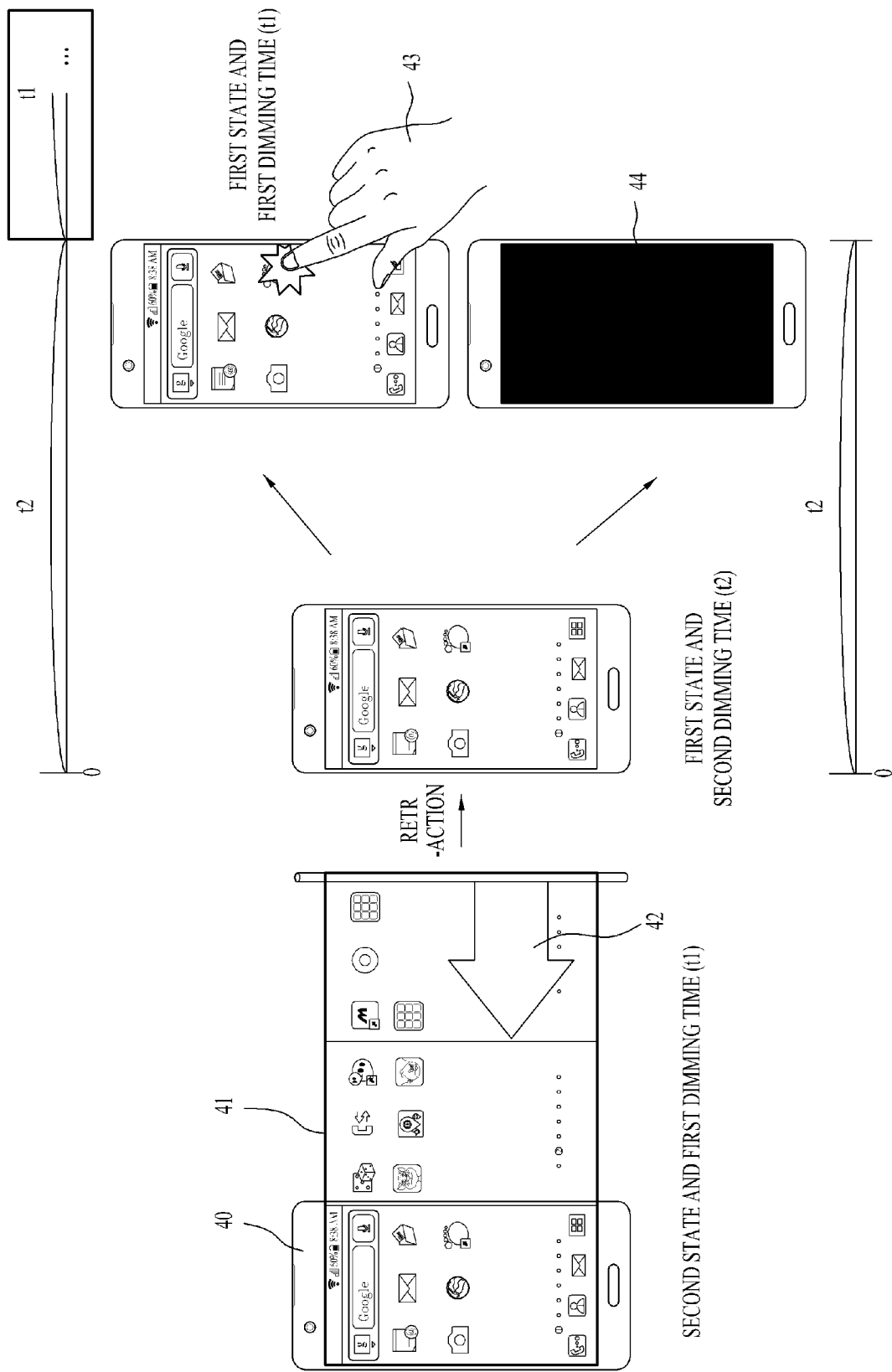
FIG. 4 is a view showing a device with a controllable dimming mode according to user input and the size of a display unit according to one embodiment.

FIG. 4 is a view showing a device with a controllable dimming mode according to user input and the size of a display unit according to one embodiment.

A display unit 41, as described above with reference to FIG. 1, may have the first state and the second state with regard to the size thereof. When the size of the display unit 41 corresponds to the first state, the device 40 may undergo the first dimming mode or the second dimming mode. In addition, when the size of the display unit 41 corresponds to the second state, the device 40 may be the first dimming mode. Hereinafter, the dimming modes based on the size of the display unit 41 will be described, and a control method for the device 40 in response to user input 43 in each dimming mode will be described in detail.

First, the display unit 41 may be retracted, as represented by an arrow 42, from the second state to the first state. In this case, the dimming mode of the device 40 may be converted. In one embodiment, when the display unit 41 is retracted into the first state as represented by the arrow 42, the device 40 may be converted from the first dimming mode to the second dimming mode. Once conversion from the first dimming mode to the second dimming mode has been performed, the device 40 may count a second dimming time t2 corresponding to the second dimming mode. Alternatively, once conversion from the first dimming mode to the second dimming mode has been performed, the device may operate a timer that counts the second dimming time t2. In the present embodiment, the second dimming time t2 may be shorter than a first dimming time t1. It will be appreciated from the above description of FIG. 3 that retracting the display unit 41 as represented by the arrow 42 indicates that the user no longer wishes to use an expanded region of the display unit 41.

When the predetermined user input 43 is sensed within the second dimming time t2, the device 40 may revert from the second dimming mode into the first dimming mode. On the contrary, when the predetermined user input 43 is not sensed within the second dimming time t2, the device 40 may perform dimming 44 of the display unit 41. In one embodiment, the predetermined user input 43 sensed within the second dimming time t2 may include predetermined touch input of the display unit 41. The touch input 43 may be sensed as any of various touch inputs, such as a short-press touch input pattern or a long-press touch input pattern. More specifically, when the touch input 43 is a short-press touch input, the predetermined touch input may include touch input sensed at an arbitrary point of the display unit 41. Alternatively, the predetermined touch input 43 may include touch input sensed at a specific point of the display unit 41. In this case, the device 40 may display a software button on the display unit 41 to guide the user to touch the specific point. In addition, when the touch input 43 is long-press touch input, the predetermined touch input may represent a touch input pattern sensed in the display unit 41. Alternatively, the predetermined touch input 43 may represent touch input continuously sensed beyond a predetermined time. In addition, the device 40 may perform dimming mode conversion by sensing user input, such as the face, fingerprint, voice, or gesture of the user, or by sensing input of pressing a hardware button provided at the device. However, the user input 43 is not limited to the above-described embodiments, and may include any of various other user inputs. Various embodiments of the predetermined user input 43 will be described hereinafter in more detail with reference to FIG. 5.

Figure 5:
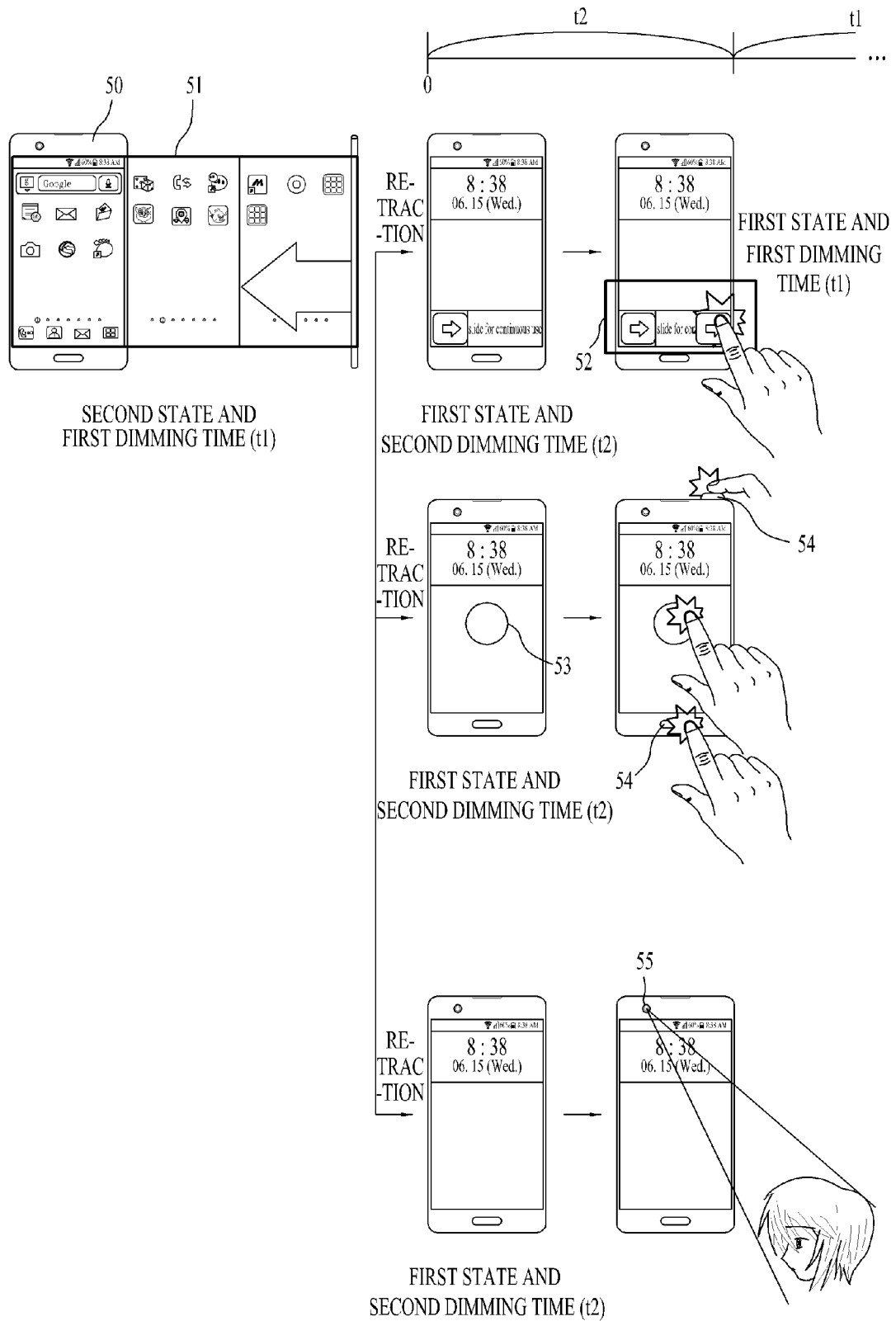
FIG. 5 is a view showing a device with a controllable dimming mode according to user input and the size of a display unit according to one embodiment.

FIG. 5 is a view showing a device with a controllable dimming mode according to user input and the size of a display unit according to one embodiment. More specifically, when a display unit 51 is retracted from the second state to the first state, the device may be converted to the second dimming mode. In this case, the device may revert to the first dimming mode when predetermined user input is sensed within the second dimming time t2. FIG. 5 shows various embodiments of the predetermined user input. In the disclosure, the predetermined user input may refer to input in which sensed user input coincides with a predetermined value. Alternatively, the predetermined user input may refer to input in which sensed user input exceeds a threshold. The predetermined user input may be variously set according to various embodiments of user input that will be described hereinafter.

In one embodiment, the predetermined user input may include a specific touch input pattern on the display unit. More specifically, the user input may be a continuously sensed specific touch input pattern. When the sensed touch input pattern coincides with a predetermined pattern, the device 50 may revert to the first dimming mode. In this case, the device 50 may display an unlocking interface 52 on the display unit 51 to guide user touch input. Accordingly, the user may perform dimming mode conversion by inputting a touch input pattern under guidance of the unlocking interface 52.

In another embodiment, the predetermined user input may include touch input to an arbitrary point or a specific point of the display unit 51. More specifically, when the predetermined user input is touch input to the arbitrary point of the display unit 51, the user may perform dimming mode conversion in response to the touch input of the display unit 51. When the predetermined user input is touch input to a specific point of the display unit 51, a software button that indicates the specific point may be displayed on the display unit 51.

In addition, when the user input is touch input, the predetermined user input may include input in which the length of a touch input pattern or the duration of touch input exceeds a threshold. However, the user touch input is not limited to the above-described embodiment.

In another embodiment, the predetermined user input may be input of pressing a physical button 54 provided at the device 50. More specifically, when the physical button 54 provided at the device 50 is pressed and sensed, the device 50 may revert to the first dimming mode. The physical button 54 may be provided at the device 50 via any of various ways according to the use purpose or design of the device 50. For example, when the physical button 54 provided at the device 50 is a button to unlock the device 50, the user may convert the device 50 into the first dimming mode by pressing the unlock button 54 within the second dimming time t2.

In another embodiment, the predetermined user input may be input based on user face recognition, gaze direction recognition, or voice recognition. When the user input is based on the face recognition, the device 50 may sense the face of the user using a sensor unit 55 within the second dimming time t2. When the sensed face of the user matches a predetermined image, the device 50 may revert to the first dimming mode. Even in the case in which the user input is input based on the gaze direction recognition of the user, the device 50 may sense the gaze direction of the user within the second dimming time t2. When the sensed gaze direction of the user exceeds a threshold, the device 50 may revert to the first dimming mode. For example, the device 50 may revert to the first mode when the duration of the gaze direction of the user with respect to a specific point exceeds a threshold. Alternatively, when the pupil of the user is sensed and the sensed pupil coincides with a specific pupil image, the device 50 may revert to the first mode. Although not shown in the drawing, even in the case in which the user input is input based on the voice recognition of the user, the voice of the user is sensed within the second dimming time. When the sensed voice coincides with a specific voice pattern, the device 50 may revert to the first dimming mode.

As described above, the predetermined user input may include various inputs, and the aforementioned user inputs may be individually or collectively input to the device 50. Meanwhile, the user input is not limited to the above-described embodiments, and various other input methods are possible.

FIG. 6 is a view showing a portable device with a controllable dimming mode according to user touch input and retraction of a display unit according to one embodiment.

When the size of a display unit 60 is retracted from the second state to the first state, conversion to the second dimming mode may be accomplished as described above with reference to FIG. 4. However, the device of the present embodiment may maintain the first dimming mode without dimming mode conversion when both retraction of the display unit 60 to the first state and touch input 62 of the display unit 60 are sensed at the same time. The touch input 62 may refer to touch input sensed at an arbitrary point of the display unit 60.

When the first dimming mode is maintained according to the aforementioned touch input 62, the device may recount the first dimming time t1 as the display unit 60 is retracted to the first state. Accordingly, in the present embodiment, maintenance of the first dimming mode may refer to reentry to the first dimming mode according to retraction of the display unit 60 to the first state. That is, since counting of the dimming time is initiated in response to finally sensed user input, the device may recount the first dimming time t1 when the display unit 60 is retracted.

Meanwhile, the display unit 60 may be manually or automatically retracted. In the case of manual retraction, a grip member 61 may be provided at one side of the display unit 60. The grip member 61 assists the user in more easily expanding or retracting the display unit 60. When the user retracts the display unit 60 using the grip member 61, touch input of the display unit 60 is not sensed, which may cause the device to be converted to the second dimming mode. On the contrary, as exemplarily shown in the drawing, when the user grips and pushes the display unit 60 to retract the display unit 60, the touch input 62 of the display unit 60 is sensed, which may cause the device to maintain the first dimming mode.

FIG. 7 is a view showing a portable device with a controllable dimming mode according to the retraction speed of a display unit according to one embodiment.

A device 70 may control a dimming mode thereof according to the retraction speed of a display unit 71.

In one embodiment, when the retraction speed of the display unit 71 exceeds a threshold (the case as represented by reference numeral 73), the device 70 may perform dimming 74 of the display unit 71. More specifically, when the retraction speed of the display unit 71 from the second state to the first state exceeds a predetermined speed (the case as represented by reference numeral 73), the device 70 may perform dimming of the display unit 71. This is because the case as represented by reference numeral 73 in which the user retracts the display unit 71 at a high speed may indicate that the user no longer wishes to use the display unit 71.

In another embodiment, when the retraction speed of the display unit 71 is a threshold or less (the case as represented by reference numeral 72), the device 70 may be converted to the second dimming mode. More specifically, when the retraction speed of the display unit 71 from the second state to the first state is a predetermined speed or less (the case as represented by reference numeral 72), the device 70 may be converted to the second dimming mode. This is because the case as represented by reference numeral 72 in which the user retracts the display unit 71 at a low speed may indicate that the user wishes to continuously use the display unit 71. Once conversion to the second dimming mode has been performed, the device 70 may revert to the first dimming mode or may perform dimming of the display unit 71 according to whether or not predetermined user input is sensed. A more detailed description thereof is equal to or corresponds to the above description with reference to FIGS. 4 and 5.

The retraction speed of the display unit 71 may be acquired by the measurement unit 21. The retraction speed of the display unit 71 may refer to an instantaneous speed at a specific point or an average speed in a specific retracted section of the display unit 71. A description related to measurement of the retraction speed by the measurement unit 21 has been given above with reference to FIG. 2.

A predetermined speed, which is a criterion determining whether the retraction speed is high or low, may be set or changed according to user setting and the use purpose or design of the device 70. In addition, the device 70 of the present embodiment may have a single predetermined speed criterion, or a plurality of speed criteria, and is not limited to the above-described embodiment.

FIG. 8 is a view showing a portable device with a controllable dimming mode according to whether or not a retraction mode of an application is provided according to one embodiment.

In the disclosure, a retraction mode refers to an application mode that provides a retracted screen 81-1 or 81-2 that will be displayed on a display unit in the first state of the display unit. More specifically, when the display unit displays a first application screen 81 in the second state, the retraction mode may refer to a mode in which the first application screen 81 is converted to a second application screen 81-1 or 81-2 according to retraction of the display unit to the first state. The second application screen 81-1 or 81-2 may be a retracted screen 81-1 of the first application screen 81, or may be a content screen 81-2 associated with the first application 81. For example, as exemplarily shown in the drawing, when the first application screen 81 is a photograph, the device 80 may display a retracted photograph as the second application screen 81-1 upon retraction of the display unit. Alternatively, when the display unit is retracted, the device 80 may display photograph information regarding the first application screen 81 as the second application screen 81-2. The device 80 may selectively provide the retraction mode according to an application that is being executed. In one example, as exemplarily shown in the drawing, in the case of a map application 82 that may only be displayed on a large screen, the device 80 may not provide the retraction mode of the map application 82.

The device 80 may control a dimming mode thereof according to whether or not the retraction mode of the application that is being executed is provided.

In one embodiment, when an application that provides a retraction mode is being executed, the device 80 may maintain the first dimming mode upon retraction of the display unit to the first state. As the display unit is retracted to the first state while the first dimming mode is maintained, the device 80 may recount the first dimming time. In another embodiment, when the display unit is retracted to the first state, the device 80 may be converted to the second dimming mode. Meanwhile, when the display unit is retracted into the first state, the device 80 may display the second application screen 81-1 or 81-2 that is the retraction mode of the first application screen 81. Operation of the device 80 after the maintenance of the first dimming mode or conversion to the second dimming mode has been performed has been described above with reference to FIGS. 4 and 6.

In another embodiment, when an application that does not provide a retraction mode is being executed, the device may perform dimming 83 of the display unit upon retraction of the display unit to the first state. Since the device 80 does not provide the retraction mode despite retraction of the display unit, the device may directly perform dimming 83 of the display unit in order to reduce power consumption.

In addition, according to the function and use purpose of an application, the device 80 may perform dimming mode conversion or maintenance, or direct implementation of dimming 83 of the display unit upon retraction of the display unit, and this is not limited to the above-described embodiments.

For example, the device 80 may perform dimming mode conversion as described above with reference to FIGS. 1 to 7 based on the type of application. When the display unit or the device 80 is in the second state, the device 80 has the first dimming mode. Once the display unit is changed from the second state to the first state, the device 80 may perform conversion from the first dimming mode to the second dimming mode based on the type of application that is being executed. For example, the device 80 in the second state may execute a moving image playback application. When the device 80 is changed from the second state to the first state, the device 80 may perform conversion from the first dimming mode to the second dimming mode. However, for example, the device 80 in the second state may execute a map application. Once the device 80 is changed from the second state to the first state, the device 80 may not perform dimming mode conversion based on an application (i.e. the map application) that is being executed. That is, dimming mode conversion may be disabled based on the type of application that is being executed. The above-described applications (i.e. the moving image playback application and the map application) are given by way of example and dimming mode conversion may be disabled based on functionality of any of various applications.

In addition, for example, the device 80 may perform dimming mode conversion as described above with reference to FIGS. 1 to 7 based on the number of applications that are being executed. For example, two or more applications may be executed on the display unit that is in the second state. In this case, when the display unit is changed from the second state to the first state, the device 80 may perform conversion from the first dimming mode to the second dimming mode. However, when the display unit executes only one application in the second state and is changed from the second state to the first state, the device 80 may remain in the first dimming mode. That is, dimming mode conversion may be disabled based on the number of applications that are being executed. The aforementioned number of applications is given by way of example. When the display unit is changed to the first state during execution of two, three, four or five applications, dimming mode conversion may be disabled. Conversely, when the display unit is changed to the first state during execution of two, three, four or five applications or more, dimming mode conversion may be disabled.

Figure 9:
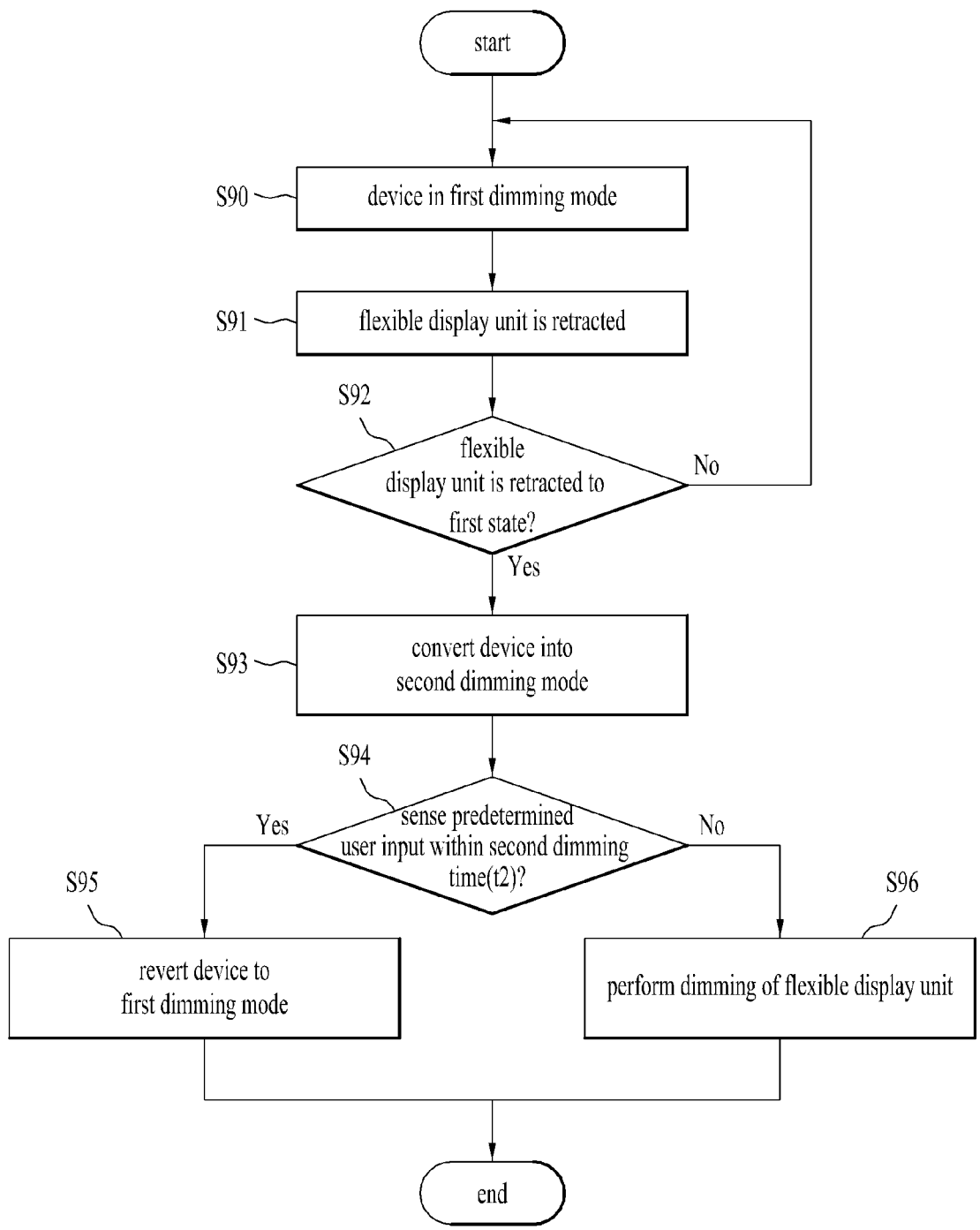
FIG. 9 is a flowchart showing a method of controlling a dimming mode of a portable device according to one embodiment.

FIG. 9 is a flowchart showing a method of controlling a dimming mode of a portable device according to one embodiment.

First, when the display unit is expanded to the second state, the device may be in the first dimming mode (S90). The first dimming mode may refer to a dimming mode that provides the first dimming time. Next, the display unit may be retracted (S91). The display unit may be retracted in any of various ways according to an installation method thereof in the device. Once retraction of the display unit has been performed, the device may judge whether or not the display unit is retracted to the first state (S92). When the display unit is not retracted to the first state, the device may not perform dimming mode conversion. However, when the display unit is retracted to the first state, the device may be converted to the second dimming mode (S93). The second dimming mode may be a dimming mode that provides the second dimming time. Meanwhile, whether or not the display unit is retracted to the first state may be judged according to whether or not the flexible display unit is retracted until the length thereof reaches a predetermined length or less.

The size, dimming mode, and retraction manner of the display unit have been described above in detail with reference to FIG. 1.

Meanwhile, in one embodiment, when both retraction of the display unit and touch input of the display unit are sensed at the same time, the device may maintain the first dimming mode as described above in detail with reference to FIG. 6. In addition, in another embodiment, the dimming mode may be controlled according to the retraction speed of the display unit and according to whether or not the retraction mode is provided as described above with reference to FIGS. 7 and 8.

When the device is converted to the second dimming mode, the device may judge whether or not predetermined user input is sensed within the second dimming time (S94). The user input may include user touch of the display unit, as well as the face, gaze direction, voice, gesture, or fingerprint recognition of the user. The device may judge whether or not the sensed user input coincides with a predetermined value. Various embodiments of the user input have been described above with reference to FIG. 5.

When the predetermined user input is sensed within the second dimming time, the device may revert to the first dimming mode (S95). Once reversion to the first dimming mode has been performed, the device may count the first dimming time. When the user input is not sensed within the first dimming time, the device may perform dimming of the display unit.

On the contrary, when the predetermined user input is not sensed within the second dimming time, the device may perform dimming of the display unit (S96). In other words, when lack of the predetermined user input within the second dimming time is sensed, the device may perform dimming of the display unit. The lack of the predetermined user input may refer to the case in which the sensed user input does not coincide with a predetermined value. Alternatively, the lack of the predetermined user input may refer to the case in which the sensed user input does not exceed a threshold.

Hereinafter, a portable device including a foldable display unit will be described with reference to FIGS. 10 to 15. A configuration and operation of the portable device as described above with reference to FIGS. 1 to 9 may be applied to the portable device that will be described below. For example, an expanded state of the flexible display unit may correspond to an unfolded state of the foldable display unit and a retracted state of the flexible display unit may correspond to a folded state of the foldable display unit. A configuration and operation of the portable device have been described above with reference to FIGS. 1 to 9 and, thus, a repeated description thereof will be omitted below.

Figure 10:
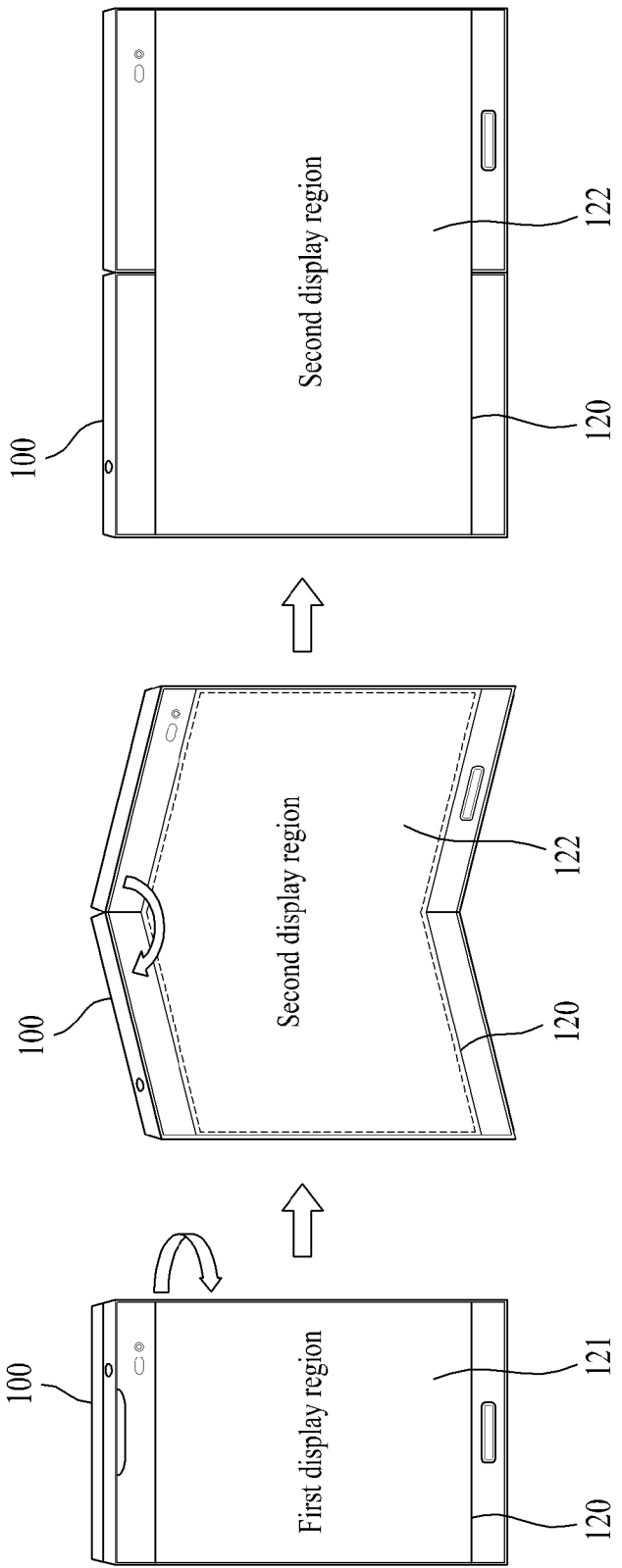
FIG. 10 is a view showing a portable device equipped with a foldable display unit according to one embodiment.

FIG. 10 is a view showing a portable device equipped with a foldable display unit according to one embodiment.

In FIG. 10, the portable device 100 includes the foldable display unit 120. The foldable display unit 120 includes a first display region 121 and a second display region 122. In a folded state of the foldable display unit 120, the first display region 121 is located at an outer side of the portable device 100 and the second display region 122 is located at an inner side of the portable device 100. Thus, when the portable device 100 is unfolded, the second display region 122 is unfolded. This division of the display regions is given by way of example. As will be described below with reference to FIG. 11, the display regions may be divided based on any of various other criteria.

The portable device 100 of FIG. 10 may display an image in the first display region 121 in a folded state thereof. In addition, the portable device 100 may display an image in the second display region 122 in an unfolded state thereof. The portable device 100 may display images in the first display region 121 as well as the second display region 122 in an unfolded state thereof. As exemplarily shown in FIG. 10, the user may expand a display region of the portable device 100 by unfolding the portable device 100. That is, when the portable device 100 is unfolded while an image is being displayed in the first display region 121, the portable device 100 may display the image in the second display region 122. In this case, the portable device 100 may no longer display the image in the first display region 121, or may perform dimming of the first display region 121. Conversely, when the portable device 100 is folded while an image is being displayed in the second display region 122, the portable device 100 may display the image in the first display region 121. In this case, the portable device may no longer display the image in the second display region 122, or may perform dimming of the second display region 122.

Figure 11:
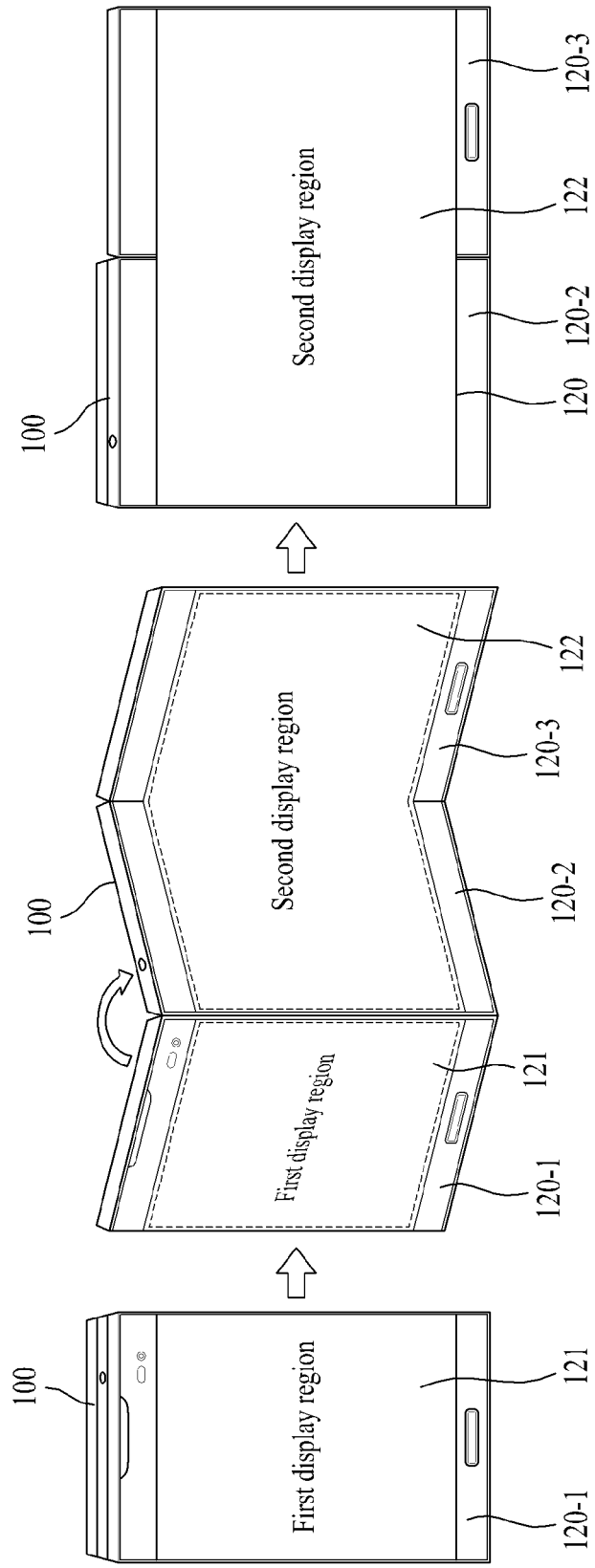
FIG. 11 is a view showing a portable device equipped with a foldable display unit according to another embodiment.

FIG. 11 is a view showing a portable device equipped with a foldable display unit according to another embodiment.

The portable device 100 of FIG. 11 includes a first display panel 120-1, a second display panel 120-2 and a third display panel 120-3. When the portable device 100 is completely unfolded, the first display panel 120-1, the second display panel 120-2 and the third display panel 120-3 face the same direction. When the first display panel 120-1 and the second display panel 120-2 are folded, front surfaces of the first display panel 120-1 and the second display panel 120-2 may face in opposite directions. In addition, when the second display panel 120-2 and the third display panel 120-3 are folded, front surfaces of the second display panel 120-2 and the third display panel 120-3 may come into contact with each other. The first display panel 120-1 may define a first display region 121 and the second display panel 120-2 and the third display panel 120-3 may define a second display region 122.

In other words, when the portable device 100 is completely folded, the first display panel 120-1 is located at an outer side of the portable device 100 and the second display panel 120-2 and the third display panel 120-3 are located at an inner side of the portable device 100. Thus, when the first display panel 120-1 and the second display panel 120-2 of the portable device 100 are folded, the first display panel 120-1 corresponds to the first display region of FIG. 10 (see reference numeral 121 of FIG. 10). In addition, the second display panel 120-2 and the third display panel 120-3, which are unfolded, correspond to the second display region of FIG. 10 (see reference numeral 122 of FIG. 10). Thus, when the first display panel 120-1 and the second display panel 120-2 are folded, the portable device 100 may be treated equally to the portable device of FIG. 10 (see reference numeral 100 of FIG. 10). Accordingly, operations of the portable device (see reference numeral 100 of FIG. 10) as described above with reference to FIG. 10 may be equally applied to the portable device 100 of FIG. 11 and operations of the portable device that will be described below with reference to FIGS. 13 to 15 may be applied to the portable device 100.

In addition, when the portable device 100 is in a completely unfolded state, only the second display panel 120-2 and the third display panel 120-3 may be folded. Unfolding of the second display panel 120-2 and the third display panel 120-3 corresponds to unfolding of the second display region of FIG. 10 (see reference numeral 122 of FIG. 10). That is, in the same manner as the portable device of FIG. 10 (see reference numeral 100 of FIG. 10), only the first display region 121 is exposed out of the portable device 100 once the second display panel 120-2 and the third display panel 120-3 are unfolded. Accordingly, dimming mode conversion that will be described below with reference to FIGS. 13 to 15 may be applied to the portable device 100 in not only a folded state but also an unfolded state of the first display panel 120-1 and the second display panel 120-2.

When the portable device 100 is completely folded, the portable device 100 may display an image in the first display region 121. In this case, the portable device 100 may perform dimming of the second display region 122. When the portable device 100 is completely unfolded, the portable device 100 may display an image in the first display region 121 and/or the second display region 122. In this case, the portable device 100 may perform dimming of one display region where no image is displayed. When the first display panel 120-1 is folded and the second display panel 120-2 and the third display panel 120-3 are unfolded, the portable device 100 may display an image in the second display region 122. In this case, the portable device 100 may perform dimming of the first display region 121. When the third display panel 120-3 is folded and the first display panel 120-1 and the second display panel 120-2 are unfolded, the portable device 100 may display an image in the first display region 121. In this case, the portable device 100 may perform dimming of the second display region 122.

In addition, as will be understood by those of ordinary skill in the art related to the present specification, a dimming method of the present specification may be applied to a portable device having a greater number of display units as well as the dual foldable type portable device of FIG. 10 or the triple foldable type portable device of FIG. 11 based on folding/unfolding of the portable device.

Figure 12:
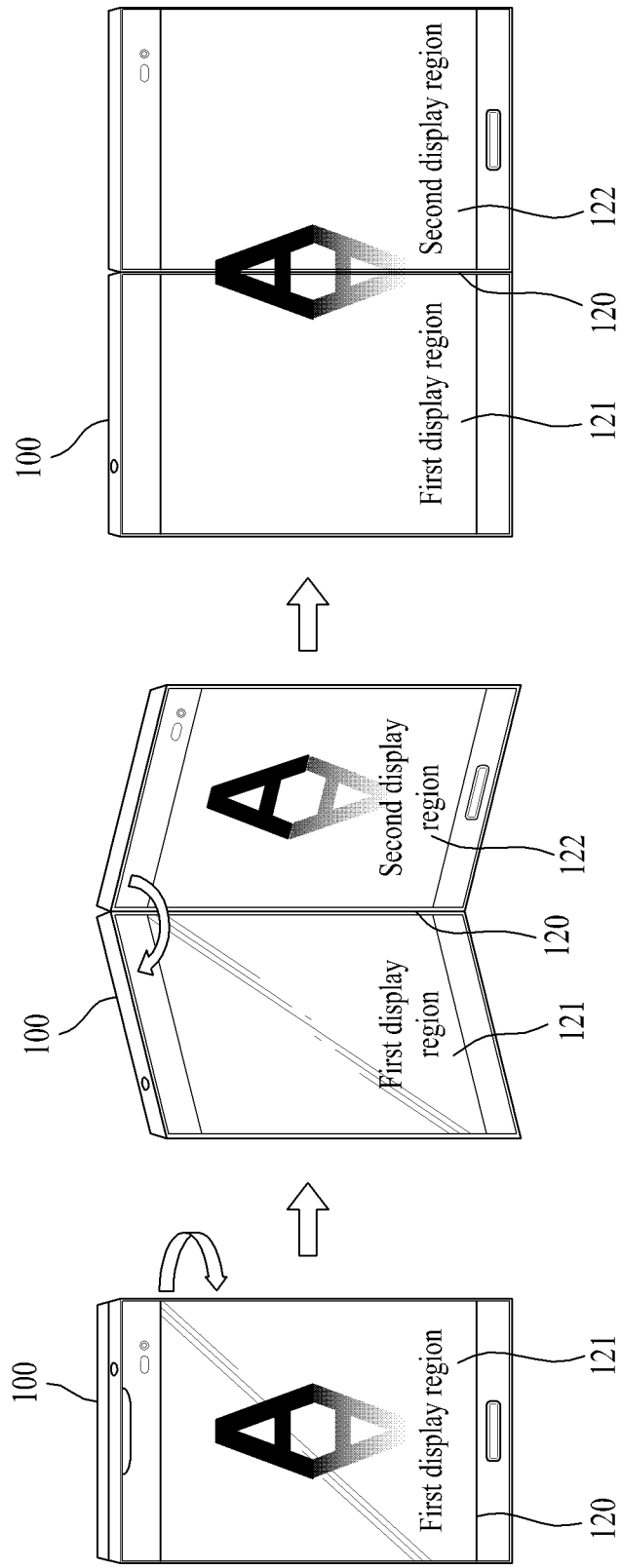
FIG. 12 is a view showing a portable device equipped with a foldable display unit according to a further embodiment.

FIG. 12 is a view showing a portable device equipped with a foldable display unit according to a further embodiment.

In FIG. 12, the portable device 100 includes the foldable display unit 120. In addition, the foldable display unit 120 includes the first display region 121 and the second display region 122. In a folded state of the foldable display unit 120, the first display region 121 is located at an outer side of the portable device 100 and the second display region 122 is also located at the outer side of the portable device 100. In addition, in an unfolded state of the portable device 100, the first display region 121 and the second display region 122 are located in the same plane. That is, in FIG. 12, the foldable display unit 120 may be divided into the first display region 121 and the second display region 122 on the basis of a folding axis of the foldable display unit 120.

In FIG. 12, the first display region 121 may include a transparent display unit. Thus, in a folded state of the foldable display unit 120, the portable device 100 may display an image in the second display region 122 and the displayed image is visible through the first display region 121. In addition, the portable device 100 may display an image in the first display region 121 in a folded state of the foldable display unit 120. The portable device 100 may display images in the first display region 121 and the second display region 122 in a folded state of the foldable display unit 120. In addition, in an unfolded state of the foldable display unit 120, the portable device 100 may display images in the first display region 121 and the second display region 122.

In FIG. 12, when the display unit 120 is changed from a folded state to an unfolded state during image display, an expanded image may be displayed throughout the first display region 121 and the second display region 122. However, upon change of the display unit 120 to the unfolded state, the portable device 100 may display an image only in the second display region 122 and perform dimming of the first display region 121. Conversely, the portable device 100 may display an image only in the first display region 121 and perform dimming of the second display region 122. In addition, the display unit 120 may be changed from the unfolded state to the folded state during image display. In this case, the portable device 100 may display an image only in the first display region 121 or the second display region 122. For example, the portable device 100 in a folded state may display an image only in the first display region 121 and perform dimming of the second display region 122, or may allow the first display region 121 to function as a backlight. Conversely, the portable device 100 in a folded state may display an image only in the second display region 122 and perform dimming of the first display region 121.

Figure 13:
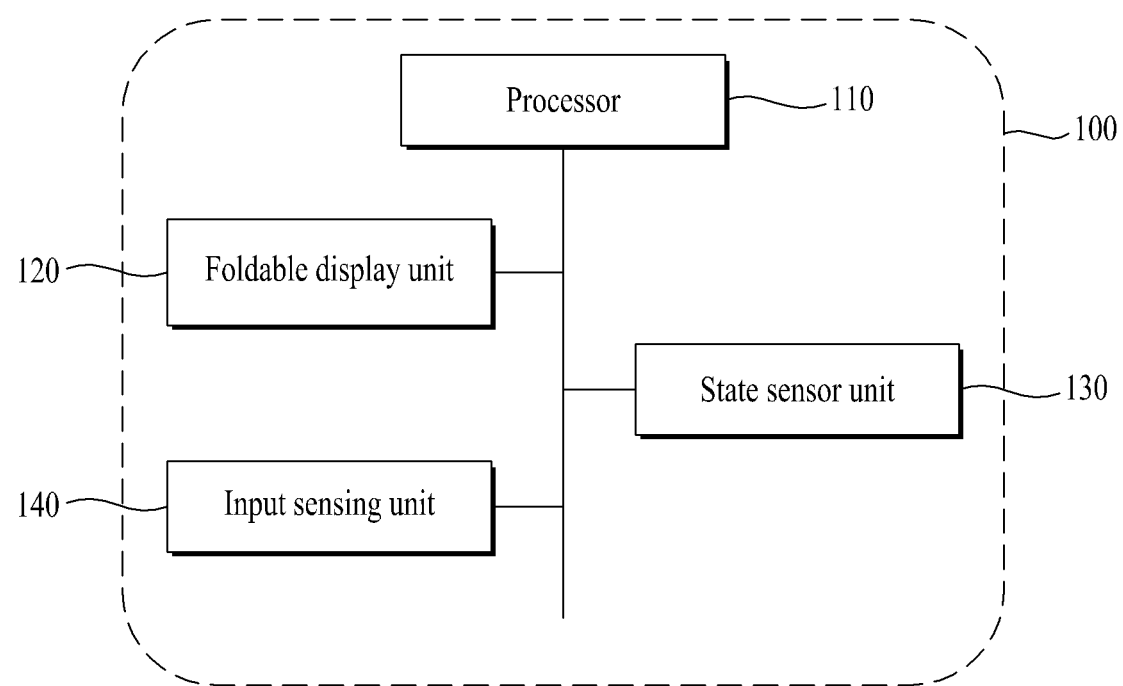
FIG. 13 is a block diagram of the portable device according to one embodiment.

FIG. 13 is a block diagram of the portable device according to one embodiment.

In FIG. 13, the portable device 100 may include a processor 110, the foldable display unit 120, a state sensor unit 130 and an input sensor unit 140.

The processor 110 may control the foldable display unit 120, the state sensor unit 130 and the input sensor unit 140. The state sensor unit 130 may correspond to the measurement unit of FIG. 2 (see reference numeral 21 of FIG. 2) and the input sensor unit 140 may correspond to the sensor unit of FIG. 2 (see reference numeral 23 of FIG. 2). A configuration and operation of the processor 110 may be substantially equal to those of the processor of FIG. 2 (see reference numeral 22 of FIG. 2). As described above, respective components corresponding to the aforementioned components have substantially the same configuration and/or operation as the above description and, thus, a repeated description thereof will be omitted below.

The foldable display unit 120 corresponds to the flexible display unit of FIG. 2 (see reference numeral 20 of FIG. 2) except for the fact that the foldable display unit 120 has a folded state or an unfolded state. In addition, the foldable display unit 120 may include the first display region and the second display region as described above with reference to FIGS. 10 to 12. In addition, dimming modes of the foldable display unit 120 are equal to the dimming modes as described above with reference to FIG. 2. That is, the processor 110 may perform dimming of the foldable display unit 120 when a predetermined dimming time has passed.

The state sensor unit 130 may detect a folded state or an unfolded state of the foldable display unit 120. The state sensor unit 130 may detect a state of the foldable display unit 120 by measuring a folding angle of the foldable display unit 120. In addition, the state sensor unit 130 may detect a state of the foldable display unit 120 by measuring relative positions, accelerations and/or proximity of the display regions located at the left and right sides of a folding axis of the foldable display unit 120. In addition, the state sensor unit 130 may detect a time taken until the foldable display unit 120 is changed from a folded state to an unfolded state. For example, the state sensor unit 130 may detect the time based on variation in a folding angle of the foldable display unit 120. In addition, the state sensor unit 130 may include a sensor which may detect a point in time when the foldable display unit 120 is completely unfolded (for example, a sensor adapted to come into contact with the completely unfolded foldable display unit 120) and detect folding initiation of the foldable display unit 120 based on a signal from the sensor. In addition, the state sensor unit 130 may include a sensor to detect a point in time when the foldable display unit 120 is folded and detect, based on a signal from the sensor, a point in time when folding of the foldable display unit 120 is completed.

Meanwhile, the input sensor unit 140 of FIG. 13 corresponds to the sensor unit of FIG. 2 (see reference numeral 23 of FIG. 2) and a repeated description thereof will be omitted below.

The processor may be described as controlling the device or at least one unit included in the device according to user input, and the processor may be synonymous with the device. Meanwhile, the portable device is exemplarily shown in FIG. 13 in the block diagram in which separate blocks logically classify elements of the device. Thus, the aforementioned elements of the device may be mounted as a single chip or a plurality of chips based on device design.

Figure 14:
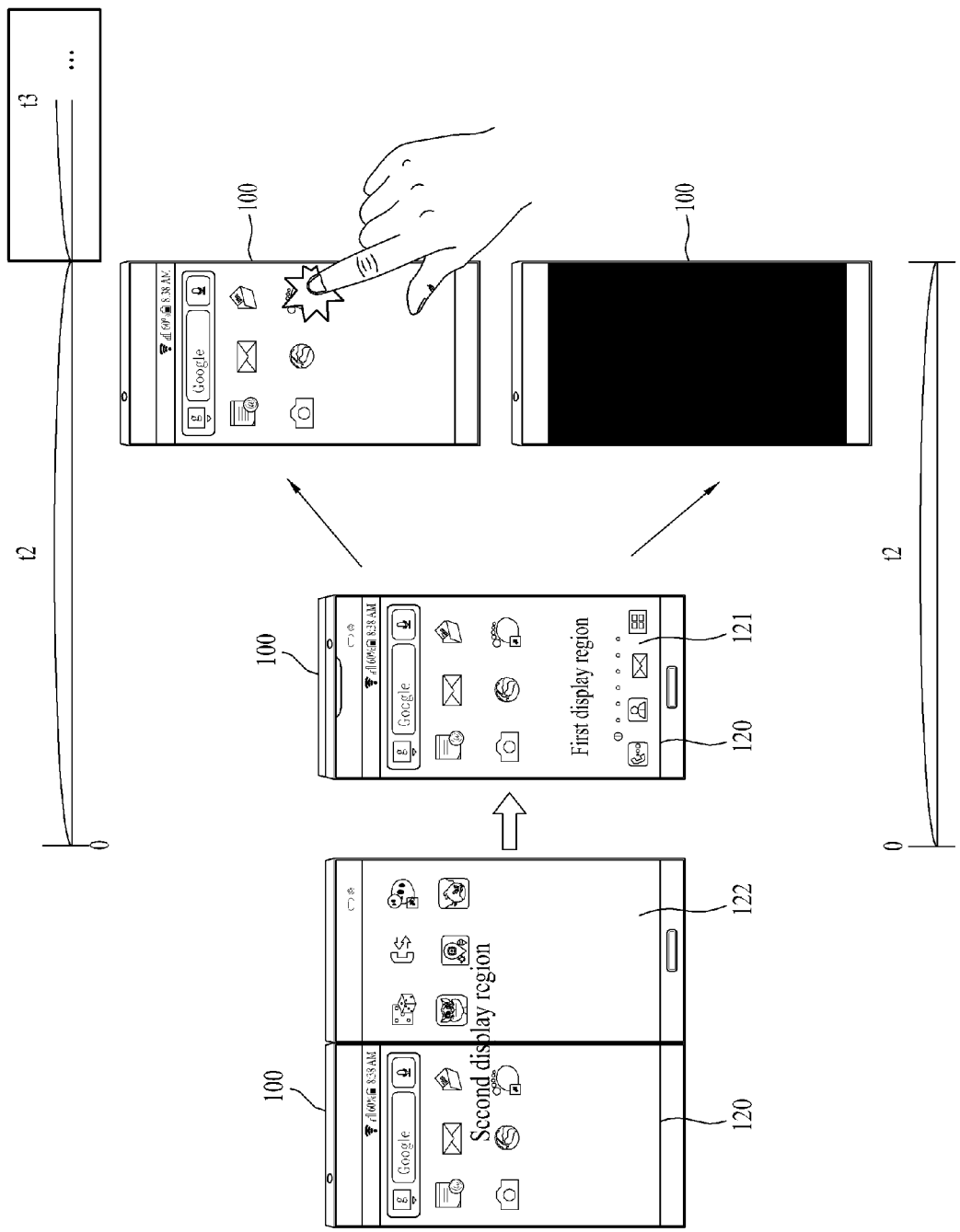
FIG. 14 is a view showing a dimming mode of the portable device according to one embodiment.

FIG. 14 is a view showing a dimming mode of the portable device according to one embodiment.

The portable device 100 may provide a plurality of dimming modes. In addition, the respective dimming modes may have different dimming times. For example, a first dimming mode may provide a first dimming time, a second dimming mode may provide a second dimming time and a third dimming mode may provide a third dimming time. The first and second dimming times are different with each other. For example, the second dimming time may be shorter than the first dimming time. And the third dimming time may be longer than the second dimming time. In addition, the portable device 100 may display a graphical user interface that counts a dimming time or indicates a dimming time in response to dimming mode conversion as described above with reference to FIG. 3.

In addition, change in the screen brightness of the foldable display unit 120 and activation of a touch sensor unit in a predetermined region of the foldable display unit 120 may be accomplished based on each dimming mode as described above with reference to FIG. 3. In addition, an unfolded state of the foldable display unit 120 corresponds to the second state of FIGS. 4 to 7 and a folded state of the foldable display unit 120 corresponds to the first state of FIGS. 4 to 7. The following description related to the embodiment of FIG. 14 is centered only on differences without description of the same parts.

In FIG. 14, the foldable display unit 120 is changed from an unfolded state to a folded state. The portable device 100 performs dimming mode conversion based on the state change of the foldable display unit 120. As exemplarily shown in FIG. 14, the portable device 100 performs conversion from a first dimming mode to a second dimming mode upon change of the foldable display unit 120 to the folded state, The second dimming mode provides a second dimming time t2.

The second dimming time t2 of the second dimming mode is shorter than a first dimming time. In addition, the portable device 100 performs dimming of the foldable display unit 120 when user input is not sensed for the second dimming time t2. However, when user input is sensed for the second dimming time t2, the portable device 100 performs dimming of the foldable display unit 120 based on a dimming time different with the second dimming time t2. For example, when user input is sensed for the second dimming time t2, the portable device 100 performs conversion from the second dimming mode to a third dimming mode. Since a third dimming time is longer than the second dimming time t2, it is possible to allow the user to continuously use the portable device 100. Meanwhile, the user input corresponds to the predetermined user input as described above with reference to FIGS. 4 and 5 and any of various other user inputs may be used for conversion of the portable device 100 from the second dimming mode to the third dimming mode. Meanwhile, the portable device 100 may provide a guide for dimming mode conversion as described above with reference to FIGS. 4 and 5.

Meanwhile, as described above, the portable device 100 may detect a time taken until the foldable display unit 120 is changed from a folded state to an unfolded state. In addition, the portable device 100 may perform dimming mode conversion based on the detected time. For example, when the detected time is a predetermined time or more, the portable device 100 may perform conversion from the first dimming mode to the second dimming mode. In addition, when the detected time is less than the predetermined time, the portable device 100 may perform dimming of the foldable display unit 120. This is because the unfolded display unit 120 may be rapidly folded when the user no longer wishes to use the portable device 100.

A criterion with respect to a time taken until the foldable display unit 120 is folded may be changed according to users, use purposes, applications that are being executed, or design of the portable device 100. In addition, the portable device 100 of the present embodiment may have a single predetermined time criterion or a plurality of time criteria, without being limited thereto.

Meanwhile, dimming mode conversion of the portable device 100 may be performed based on a "folding speed" of the foldable display unit 120. The "folding speed" may correspond to the "retraction speed" as described above with reference to FIG. 7.

The portable device 100, as described above with reference to FIG. 8, may be subjected to dimming mode control based on whether or not an application provides a retraction mode. The retraction mode of FIG. 8 may mean an application mode that provides a retracted screen to be displayed on the foldable display unit 120 in a folded state.

In addition, for example, the portable device 100 may perform dimming mode conversion as described above with reference to FIGS. 1 to 14 based on the type of application. When the foldable display unit 120 or the portable device 100 is in an unfolded state, the portable device 100 has a first dimming mode. When the foldable display unit 120 is changed from the unfolded state to a folded state, the portable device 100 may perform conversion from a first dimming mode to a second dimming mode based on the type of application that is being executed. For example, the portable device 100 in an unfolded state may execute a moving image playback application. When the portable device 100 is changed from the unfolded state to a folded state, the portable device 100 may perform conversion from a first dimming mode to a second dimming mode. However, for example, the portable device 100 in an unfolded state may execute a map application. When the portable device 100 is changed from the unfolded state to a folded state, the portable device 100 may not perform dimming mode conversion based on the application (for example, the map application) that is being executed. That is, dimming mode conversion may be disabled based on the type of application that is being executed. The above-described applications (i.e. the moving image playback application and the map application) are given by way of example and dimming mode conversion may be disabled based on functionality of any of various applications.

In addition, for example, the portable device 100 may perform dimming mode conversion as described above with reference to FIGS. 1 to 14 based on the number of applications that are being executed. For example, two or more applications may be executed on the foldable display unit 120 that is in an unfolded state. In this case, when the foldable display unit 120 is changed from the unfolded state to a folded state, the portable device 100 may perform conversion from a first dimming mode to a second dimming mode. However, when the foldable display unit 120 executes only one application in an unfolded state and is changed from the unfolded state to a folded state, the portable device 100 may remain in a first dimming mode. That is, dimming mode conversion may be disabled based on the number of applications that are being executed. The aforementioned number of applications is given by way of example. When the foldable display unit 120 is changed to a folded state during execution of two, three or four applications, dimming mode conversion may be disabled. Conversely, when the foldable display unit 120 is changed to a folded state during execution of two, three, four or five applications or more, dimming mode conversion may be disabled.

Figure 15:
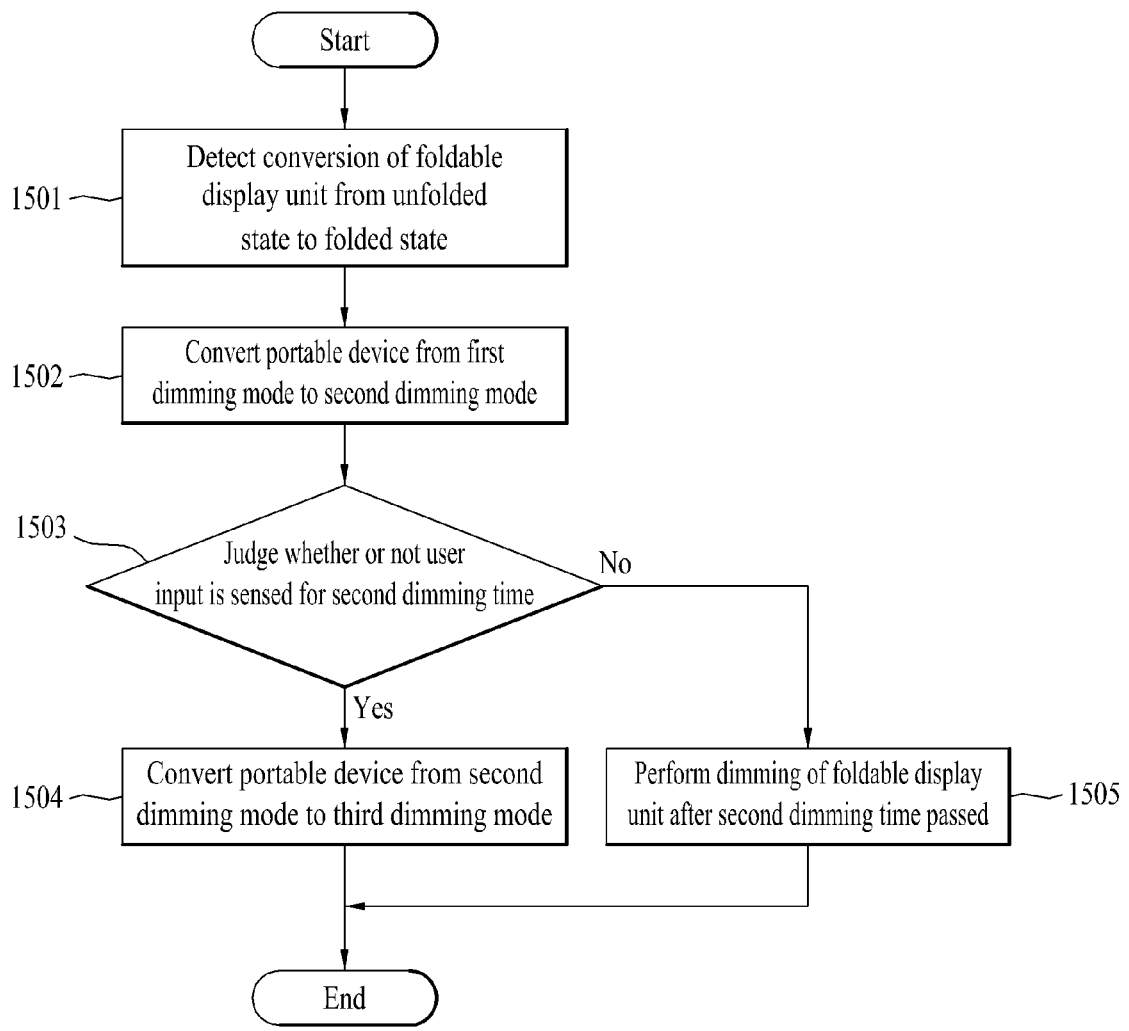
FIG. 15 is a flowchart showing a control method of a portable device according to one embodiment.

FIG. 15 is a flowchart showing a control method of a portable device according to one embodiment.

First, when the foldable display unit is in an unfolded state, the portable device may have a first dimming mode. Upon detection of change of the foldable display unit from the unfolded state to a folded state (1501), the portable device performs conversion from the first dimming mode to a second dimming mode (1502). As described above, a second dimming time of the second dimming mode is shorter than a first dimming time of the first dimming mode. After conversion of the portable device to the second dimming mode, the portable device judges whether or not user input is sensed for the second dimming time (1503). When the user input is sensed for the second dimming time, the portable device performs dimming of the foldable display unit based on a dimming time different with the second dimming time. For example, the portable device performs conversion from the second dimming mode to a third dimming mode (1504). As described above, the second dimming time of the second dimming mode is shorter than a third dimming time of the third dimming mode. Conversely, when the user input is not sensed for the second dimming time, the portable device performs dimming of the foldable display unit after the second dimming time has passed (1505).

Meanwhile, the foldable display unit may have any of various shapes and be controlled based on any of various user inputs as described above with reference to FIGS. 10 to 14. In addition, as will be understood by those of ordinary skill in the art, the detailed description of FIGS. 1 to 9 recited with respect to FIGS. 10 to 14 may be combined with the control method of the portable device of FIG. 15.

Although the respective drawings have been described individually for convenience, the embodiments described in the respective drawings may be combined to realize novel embodiments. In addition, designing a computer readable recording medium in which a program to execute the above described embodiments is recorded according to a need of those skilled in the art is within the scope of the disclosure.

The device and the control method for the same according to the disclosure are not limited to the configurations and methods of the above described embodiments, and all or some of the embodiments may be selectively combined to achieve various modifications.

In addition, although the exemplary embodiments have been described above, it should be understood that the disclosure is not limited to the above-described particular embodiments, and numerous variations and modifications may be devised by those skilled in the art that will fall within the spirit and scope of the principles of this disclosure, drawings and the appended claims, and that the numerous variations and modifications should not be understood individually from the technical ideal or view of the disclosure.

In the disclosure, widths, areas, and lengths may not only refer to accurate values, but also include widths, areas, and lengths within a predetermined range. That is, the expansion degree of the flexible display unit in the disclosure may refer to a substantial expansion degree, and may have a tolerance within a predetermined range.

In addition, the disclosure describes both an object invention and a method invention, and description of both inventions may be selectively applied as necessary.

As is apparent from the above description, according to one embodiment, as a result of controlling a dimming mode of a portable device according to predetermined user input and retraction of a flexible display unit, the dimming mode may be controlled to conform to the intension of a user retracting the flexible display unit. Accordingly, the device may provide the user with a more convenient dimming mode.

Further, as a result of controlling the dimming mode of the device according to whether the retraction speed of the flexible display is greater or less than a predetermined speed, the dimming mode may be controlled to conform to the intention of the user who retracted the flexible display at a high or low speed.

Furthermore, as a result of controlling the dimming mode of the device according to whether or not an application that is being executed provides a retraction mode, reduced power consumption of the device may be accomplished.

What is claimed is:

1. A portable device comprising:
a foldable display unit including a first display region and a second display region;
a state sensor unit configured to detect a folded state and an unfolded state of the foldable display unit;
an input sensor unit configured to sense user input; and
a processor configured to control the foldable display unit, the state sensor unit and the input sensor unit,
wherein the portable device provides a dimming mode for dimming at least a part of the foldable display unit when the user input is not sensed for a dimming time,
wherein the processor is further configured to:
convert the portable device from a first dimming mode to a second dimming mode upon detection of change of the foldable display unit from the unfolded state to the folded state, wherein the first dimming mode provides a first dimming time, wherein the second dimming mode provides a second dimming time different with the first dimming time;
perform dimming of the foldable display unit upon reaching the second dimming time when the user input is not sensed in the second dimming mode within the second dimming time; and
perform dimming of the foldable display unit based on a dimming time different with the second dimming time when the user input is sensed in the second dimming mode within the second dimming time.

2. The portable device according to claim 1, wherein the processor is further configured to convert the portable device from the second dimming mode to a third dimming mode when the user input is sensed in the second dimming mode within the second dimming time, wherein the third dimming mode provides a third dimming time and wherein the third dimming time is longer than the second dimming time.

3. The portable device according to claim 1, wherein the second dimming time is shorter than the first dimming time.

4. The portable device according to claim 1, wherein the second display region is located at an inner side of the portable device in the folded state of the foldable display unit and located at an outer side of the portable device in the unfolded state of the foldable display unit.

5. The portable device according to claim 4, wherein the first display region and at least a portion of the second display region face in opposite directions.

6. The portable device according to claim 5, wherein the processor is further configured to:
    display at least one content in the first display region in the folded state of the foldable display unit; and
    display the at least one content in the second display region in the unfolded state of the foldable display unit.

7. The portable device according to claim 1, wherein the foldable display unit includes a transparent display unit and an opaque display unit divided by a single folding axis,
    wherein the first display region is located on the transparent display unit and the second display region is located on the opaque display unit, and
    wherein the second display region is located at an inner surface of the portable device in the folded state of the foldable display unit.

8. The portable device according to claim 7, wherein the processor is further configured to:
    display at least one content in at least one of the first display region and the second display region in the folded state of the foldable display unit; and
    display the at least one content in the first region and the second region in the unfolded state of the foldable display unit.

9. The portable device according to claim 1, wherein the processor is further configured to:
    convert the portable device from the second dimming mode to a third dimming mode when predetermined user input is sensed in the second dimming mode within the second dimming time, wherein the third dimming mode provides a third dimming time and wherein the third dimming time is longer than the second dimming time; and
    perform dimming of the foldable display unit upon reaching the second dimming time when the predetermined user input is not sensed in the second dimming mode within the second dimming time.

10. The portable device according to claim 9, wherein the predetermined user input includes touch input to a soft button displayed at a specific point of the foldable display unit.

11. The portable device according to claim 9, wherein the predetermined user input includes touch input to the foldable display unit, the touch input having a touch input length exceeding a threshold length.

12. The portable device according to claim 1, wherein dimming of the foldable display unit includes blacking out of the foldable display unit.

13. The portable device according to claim 1, wherein dimming of the foldable display unit gradually proceeds as time passes.

14. The portable device according to claim 1, wherein the processor is further configured to change the portable device to a locked state upon dimming of the foldable display unit.

15. The portable device according to claim 14, wherein the processor is further configured to deactivate at least one of the foldable display unit, the state sensor unit and the input sensor unit upon change of the portable device to the locked state.

16. The portable device according to claim 1, wherein the processor is further configured to:
    detect a time that it takes the foldable display unit to change from the folded state to the unfolded state;
    convert the portable device from the first dimming mode to the second dimming mode when the detected time is equal to or more than a predetermined time; and
    perform dimming of the flexible display unit when the detected time is less than the predetermined time.

17. The portable device according to claim 1, wherein the first dimming mode and the second dimming mode have different brightness of the foldable display unit.

18. The portable device according to claim 3, wherein, when the processor senses touch input, as the user input, to the foldable display unit, the first dimming mode and the third dimming mode are modes to allow the processor to activate sensing of the touch input to an overall region of the foldable display unit, and the second dimming mode is a mode to allow the processor to activate sensing of the touch input to a specific region of the foldable display unit.

19. The portable device according to claim 1, wherein the input sensor unit includes a sensor configured to recognize at least one of a user's face, a gaze direction and voice as the user input.

20. A control method for a portable device, the portable device comprising a foldable display unit, the control method comprising:
    detecting conversion of the foldable display unit from an unfolded state to a folded state;
    converting the portable device from a first dimming mode to a second dimming mode, wherein the first dimming mode provides a first dimming time, wherein the second dimming mode provides a second dimming time different with the first dimming time;
    performing dimming of the foldable display unit upon reaching the second dimming time when the user input is not sensed in the second dimming mode within the second dimming time; and
    performing dimming of the foldable display unit based on a dimming time different with the second dimming time when the user input is sensed in the second dimming mode within the second dimming time.

* * * * *